United States Patent
Ogawa et al.

(10) Patent No.: US 7,029,127 B2
(45) Date of Patent: Apr. 18, 2006

(54) PROJECTOR

(75) Inventors: Yasunori Ogawa, Suwa (JP); Hirohisa Nakano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/791,720

(22) Filed: Mar. 4, 2004

(65) Prior Publication Data

US 2004/0246448 A1 Dec. 9, 2004

(30) Foreign Application Priority Data

| Mar. 6, 2003 | (JP) | ................................. 2003-060454 |
| Jun. 10, 2003 | (JP) | ................................. 2003-164874 |

(51) Int. Cl.
  *G03B 21/14* (2006.01)

(52) U.S. Cl. .......................................... 353/84; 353/31

(58) Field of Classification Search .................. 353/31, 353/34, 37, 84; 349/5, 7, 8, 9; 348/742, 743
See application file for complete search history.

(56) References Cited

U.S. PATENT DOCUMENTS 5,946,114 A * 8/1999 Loiseaux et al. ............. 359/15
6,783,244 B1 * 8/2004 Okuyama et al. ............. 353/57
6,824,276 B1 * 11/2004 Kimura ......................... 353/84

FOREIGN PATENT DOCUMENTS

| JP | 08-304739 | 11/1996 |
| JP | 11-249098 | * 9/1999 |
| JP | 2000-347292 | 12/2000 |
| JP | A-2001-174774 | 6/2001 |
| JP | A-2001-228536 | 8/2001 |
| JP | 2001-264744 | 9/2001 |
| JP | 2002-174805 | 6/2002 |

* cited by examiner

*Primary Examiner*—William C. Dowling
(74) *Attorney, Agent, or Firm*—Oliff & Berridge, PLC

(57) ABSTRACT

A projector includes a light source, a color separating optical system, liquid crystal panels, a cross dichroic prism, and a projection lens, in which an optical filter is disposed to reflect a predetermined spectral component in the light flux between a dichroic mirror and a dichroic mirror where an angle by which the light flux expands falls within 20° with respect to an illumination optical axis L of the light flux on an optical path from the light source device to a light flux-emitting surface of the projecting lens. Thus, carrying out spectrum correction can reduce or prevent the contrast degradation of the projected image. Furthermore, it allows the difference of an incident angle to the light flux-incident surface of the light flux to be smaller, thereby reducing color unevenness.

23 Claims, 16 Drawing Sheets

PROJECTOR

BACKGROUND OF THE INVENTION

1. Field of Invention

The present invention relates to a projector, for example, that includes a light source device, a color separating optical system to separate a light flux emitted from the light source device into a plurality of color light components, a plurality of optical modulation devices to modulate the separated color light components respectively according to image information, a color combining optical system to combine the optical images modulated by the respective optical modulation devices, and a projection optical system to enlarge and project the combined optical image.

2. Description of Related Art

Related art projectors have been used for presentations, home theaters, or the like. There is, for example, a projector with enhanced image quality, including a light source device, a color separating optical system to separate a light flux emitted from the light source into a plurality of color light components, three optical modulation devices, such as liquid crystal panels or the like, to modulate the separated color light components respectively according to image information, a color combining optical system, such as a prism or the like, to combine the color light components modulated by the optical modulation devices, and a projection optical system to enlarge and project the combined optical image, as described in Japanese Unexamined Patent Application publication No. 2002-174805.

In such a projector, in order to give sufficient brightness to a projected image when the projector is used as a data projector for business, an extra-high pressure mercury lamp having high relative intensity of a spectrum (500 nm to 570 nm) in a green wavelength range or a spectrum (420 nm to 460 nm) in a blue color wavelength range, is used as a light source.

However, there is a problem that even though the projector including the light source is intended to be used only in home, a white colored portion changes into white color adulterated with green color in a projected image, because of a strong appearance of a green color wavelength range. This results in contrast degradation.

There is a related art configuration in which a front end of a projection lens is covered with a cap-shaped optical filter to eliminate a predetermined spectral component to address this problem. Here, the optical filter is a reflective optical filter having a substrate, and a film (dichroic film) having a different index of refraction laminated on a light flux-incident surface of this substrate. With this configuration, the optical image emitted from the projection lens can pass through the optical filter simply and surely, thereby preventing contrast degradation.

SUMMARY OF THE INVENTION

However, the above-stated optical filter has different reflecting properties according to the incident angles of a light flux. Further, the projection lens has a structure to emit the light flux so that the light flux expands by an angle of about 30° or more with respect to a center of an optical path or an optical axis of a projection lens in order to form an enlarged projected image. Accordingly, if the center of the optical path and the optical axis of the projection lens are matched to each other, the incident angle of the light flux, which forms an end portion of the projected image, increases with respect to the optical filter, resulting in color unevenness at an end portion and a center portion of the projected image. Further, if the center of the optical path and the optical axis of the projection lens are not matched to each other, the incident angle of light, with respect to the optical filter, becomes larger as it becomes farther away from the optical axis of the projection lens, resulting in color unevenness at a portion intersecting with an extended line of the optical axis of the projection lens and at a portion most remote from that in the projected image.

The present invention provides a projector capable of reducing or preventing the contrast of a projected image from being degraded and, at the same time, reducing color unevenness.

The projector of an aspect of the present invention includes a light source device, a color separating optical system to separate a light flux emitted from the light source device into a plurality of color light components, a plurality of optical modulation devices to modulate the color light components separated by the color separating optical system according to image information, respectively, a color combining optical system to combine the optical images modulated by the plurality of optical modulation devices, and a projection optical system to enlarge and protect the optical image combined by the color combining optical system.

The projector of an aspect of the present invention includes an optical filter to reflect predetermined spectral components in the light flux at a position where an angle by which the light flux expands, falls within 20° with respect to an illumination optical axis of the light flux on an optical path from the light source device to a light flux-emitting surface of the projection optical system. Here, "the illumination optical axis" is a virtual axis formed by a series of optical elements disposed on an optical path from the light source device to a light flux-emitting surface of the projection optical system, and is substantially consistent with a center axis of a light flux extended from the light source device to the light flux-emitting surface of the projection optical system. Further, "angle by which the light flux expands" refers to the angle difference of light with respect to the illumination optical axis. Thus, "an angle by which the light expands falls within 20° with respect to the illumination optical axis of the light flux" indicates that the angle difference of the light is in the range of 0° or more to ±20° or less with respect to the illumination optical axis. This is applied to the other portions of this specification.

Here, a high-pressure discharge lamp, such as extra-high pressure mercury lamp, may be adopted as the light source device. In the extra-high pressure mercury lamp, the intensity of a green light component (light quantity in a wavelength range of the green color light) is generally highest. Further, there is a tendency that the intensity of the green color light (light quantity in a wavelength range of the green color light) and the intensity of a blue light component (light quantity in a wavelength range of the blue color light) are higher. The intensity of a red light component (light quantity in a wavelength range of the red color light) is lower. Normally, the intensity of the red color light is about 70% of the intensity of the green color light. The intensity of the blue color light is about 90% of the intensity of the green color light.

Further, for example, a filter including a substrate composed of a blue plate glass, a white plate glass and the like, and a dichroic film in which thin films having different index of refraction, are alternately laminated on the surface of this substrate and may be adopted as the optical filter.

With this configuration, it is possible to reduce or prevent the contrast of a projected image from being degraded by reflecting and eliminating a predetermined spectral component using the optical filter to carry out spectrum correction.

The optical filter is disposed at a position where the extension of the light flux falls within 20° from a center of the optical path, thereby reducing color unevenness on a projected image.

In an aspect of the present invention, the projector may include a case to house a plurality of optical components disposed on the optical path of the light flux, the case including a moving mechanism to move the optical filter into and out of the optical path.

Here, as the moving mechanism, there may be: a configuration to slide an optical filter inwardly thereof, which is disposed to intersect at an angle substantially vertical to the illumination optical axis or at an angle which is not vertical to the illumination optical axis, a configuration to slide an optical filter while changing the posture (direction) of the optical filter, a configuration to rotate an optical filter about a rotational shaft; or a configuration to open and close an optical filter divided into two sections in the form of double doors.

With these configurations, the optical filter is retreated from the optical path in business use and the optical filter is moved along the optical path in home use, thereby obtaining a proper projected image according to utilization purpose.

Next, the projector of an aspect of the present invention includes a case to house a plurality of optical components disposed on an optical path of the light flux; an optical filter to reflect predetermined spectral components in the light flux; and a moving mechanism to move the optical filter into and out of the optical path by rotating the optical filter inside the case.

With this configuration, because the optical filter rotates inside the case, the optical filter remains inside the case when the optical filter moves out of the optical path. Thus there is no need for a space to arrange the protruded optical filter in the case. Also, there is no need to particularly consider the movement of the optical filter for the size of the case. Further, the optical filter does not move out of the case upon moving the optical filter. Thus, there is no need to consider a shield as a light leakage counterplan.

The moving mechanism may rotate the optical filter between a position the light flux passes through and a position the light flux does not pass through, along a side wall on the optical path in the case.

With this configuration, it is possible to obtain a proper projected image by moving the optical filter according to utilization purpose of the projector. Further, because the optical filter moves along a sidewall on the optical path of the case, there is no need to particularly consider a space to assemble the optical filter into the case. Thus the size of the case can be made smaller.

The case has a plane substantially parallel to a plane formed by the illumination optical axis. The moving mechanism includes a rotating portion rotatably supported by the plane of the case. The optical filter is retained in the rotating portion and moves according to rotational movement of the rotating portion.

With this configuration, since the moving mechanism is disposed at a plane substantially parallel to a plane formed by an illumination optical axis, it is possible to minimize a portion by which the moving mechanism exceeds the case in plan view, thereby preventing it from becoming unnecessarily larger and making the projector smaller.

Furthermore, the optical filter may be mounted in a filter frame having a retaining portion protruded from the optical filter. The rotating portion has an engagement hole engaged with the retaining portion in the filter frame, and a guide groove is disposed between the optical filter and the rotating portion to guide the movement of the optical filter by guiding the retaining portion.

With this configuration, it becomes possible to configure the moving mechanism in a simple structure by moving the optical filter by the engagement hole formed in the rotating portion while guiding a retaining portion of the optical filter by the guide groove. Further, it becomes possible to move the optical filter smoothly.

Next, a projector of an aspect of the present invention includes an optical filter to reflect predetermined spectral components in the light flux and a moving mechanism to move the optical filter into and out of the optical path. The moving mechanism slides the optical filter out of the optical path, by allowing a first side, which is closer to an optical component downstream in the optical path from the optical filter and remoter from an optical component upstream in the optical path from the optical filter, to be moved to upstream in the optical path and by allowing a second opposite side to be positioned downstream in the optical path, from among the two sides of the optical filter perpendicular to a plane formed by an illumination optical axis.

The moving mechanism may include a first shaft to support a portion of a side different from the first and second sides of the optical filter and disposed in the vicinity of the first side; a second shaft to support a portion of the side different from the first and second sides of the optical filter and closer to the second side from the first side; a first guide groove to guide the first shaft so that the first shaft is movable along a direction substantially parallel to the illumination optical axis; and a second guide groove to guide the second shaft so that the second shaft is movable along a direction which is not parallel to the illumination optical axis.

With this configuration, the movement of the optical filter can be realized in a smaller space in moving the optical filter. Thus, it is advantageous to minimize an optical system, and further a projector.

Further, the moving mechanism may include a rotating portion rotatably supported on a plane parallel to the plane formed by the illumination optical axis. The first shaft and the second shaft are retained in the rotating portion through the first guide groove and the second guide groove, respectively.

With this configuration, it becomes possible to configure a moving mechanism in a simple structure. Further, it becomes possible to move the optical filter smoothly.

Next, an aspect of the present invention includes an optical filter to reflect predetermined spectral components in the light flux; and a moving mechanism to move the optical filter into and out of the optical path. The moving mechanism moves the optical filter out of the optical path, by allowing an opposite side to be rotated using, as a shaft, in the vicinity of a side which is closer to an optical component downstream in the optical path from the optical filter and remoter from an optical component upstream in the optical path from the optical filter, from among the two sides of the optical filter perpendicular to a plane formed by an illumination optical axis.

With this configuration, a configuration of the moving mechanism becomes simpler in moving the optical filter. Thus, it is advantageous in manufacturing ease and cost.

In an aspect of the present invention, the optical filter can be disposed between the light source device and the color separating optical system.

According to this aspect of the invention, it becomes possible to pass the optical filter, before a light flux from the light source device is separated into a plurality of color light components, thereby correcting the spectra of all color light components. Thus a high definition projected image is obtained.

Further, the spectrum corrected light flux is incident to the optical modulation device, thereby reducing the likelihood or preventing the optical modulation device from being overheated.

Further, the projector may include a uniform-illumination optical system disposed between the light source device and the color separating optical system to divide the light flux emitted from the light source device into a plurality of partial light fluxes and overlapping the respective partial light fluxes on an image forming area of the optical modulation device, the optical filter being disposed in the uniform-illumination optical system.

The uniform-illumination optical system normally includes an optical element having a function of dividing a light flux emitted from the light source device into a plurality of partial light fluxes, and an optical element having a function of overlapping respective partial light fluxes on an image forming area of the optical modulation device. There is a need for a certain space between the optical elements to focus the plurality of partial light fluxes. It becomes possible to dispose the moving mechanism without increasing the size of the projector using the above space by disposing the moving mechanism in the uniform-illumination optical system.

In an aspect of the present invention, the optical filter may be disposed in the color separating optical system.

According to this aspect of the invention, it is possible to simplify the structure, for example, by correcting only a spectrum of a minimum color light requiring correction among the plurality of color light separated by the color separating optical system. In detail, in particular, it may be possible to select a color light having high intensity as a target to be corrected and to correct the spectrum of the color light on a basis of color light components other than the target.

Further, a spectrum corrected light flux is incident to the optical modulation device, thereby reducing the likelihood or preventing the optical modulation device from being overheated.

In an aspect of the present invention, the color separating optical system may include a first color light separating optical element to separate the light emitted from the light source device into a first color light component and other color light components, and a second color light separating optical element to separate the other color light components separated by the first color light separating optical element into a second color light component and a third color light component, the optical filter being disposed between the first color light separating optical element and the second color light separating optical element.

With this configuration, the spectrum correction can be simultaneously carried out on the second and third color light components by one optical filter, thereby reducing or preventing the optical modulation device from being overheated in addition to simplifying its structure.

In an aspect of the present invention, the optical filter can be considered as being disposed between the color combining optical system and the projection optical system.

With this configuration, a combined light combined in a color combining optical system passes through the optical filter to allow all color light components to be subject to spectrum correction, thereby obtaining a high definition projected image.

DETAILED DESCRIPTION OF EXEMPLARY EMBODIMENTS

A. First Exemplary Embodiment

Hereinafter, the first exemplary embodiment of the present invention will be described with reference to the accompanying drawings.

1. Major Configuration of Projector

Figure 1:
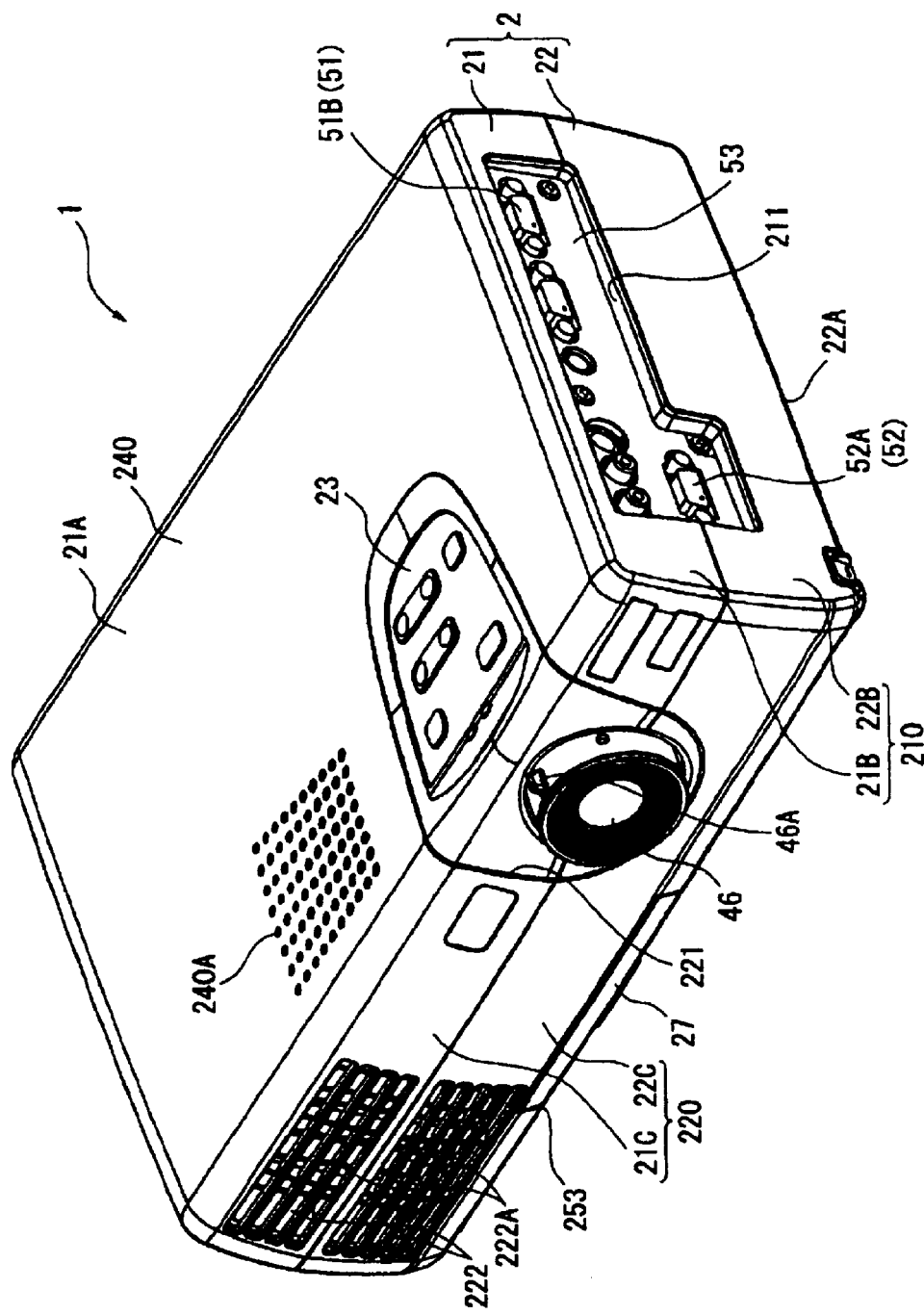
FIG. 1 is a schematic of a projector according to the first exemplary embodiment of the present invention viewed from the top.
Figure 2:
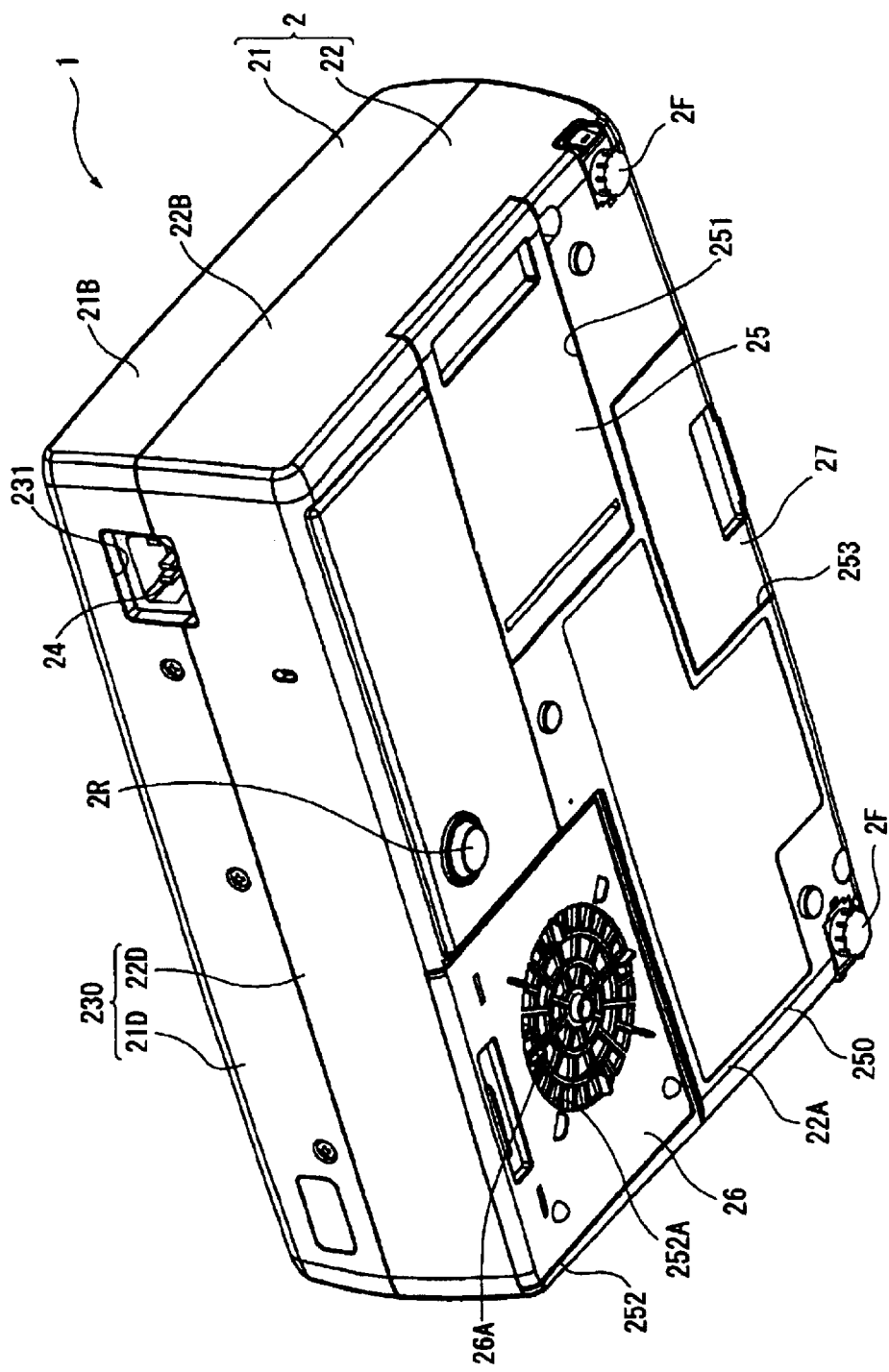
FIG. 2 is a schematic of a projector according to the first exemplary embodiment viewed from the bottom.

FIG. 1 is a schematic of a projector 1 according to the first exemplary embodiment of the present invention viewed from the top. FIG. 2 is a schematic of a projector 1 viewed from the bottom.

As shown in FIG. 1 or 2, the projector 1 includes a substantially rectangular parallelepiped external case 2 molded by injection molding. This external case 2 is a synthetic resin case to house a main body of the projector 1, and includes an upper case 21 and a lower case 22, which are configured to be detachable from each other.

The upper case 21, as shown in FIGS. 1 and 2, includes an upper face portion 21A, a side face portion 21B, a front face portion 21C and a rear face portion 21D constituting an upper face, a side face, a front face and a rear face of the projector 1, respectively.

Similarly, the lower case 22, as shown in FIGS. 1 and 2, also includes a bottom face portion 22A, a side face portion 22B, a front face portion 22C and a rear face portion 22D constituting a bottom face, a side face, a front face and a rear face of the projector 1, respectively.

Thus, as shown in FIGS. 1 and 2, in the rectangular parallelepiped external case 2, side face portions 21B and 22B of the upper case 21 and the lower case 22 are continuously coupled to each other to form a side face portion 210 of the rectangular parallelepiped. Similarly, a front face portion 220 is formed by interconnecting the front face portions 21C and 22C. A rear face portion 230 is formed by interconnecting the rear face portions 21D and 22D. An upper face portion 240 is formed by the upper face portion 21A, and a bottom face portion 250 is formed by the bottom face portion 22A, respectively.

As shown in FIG. 1, in the upper face portion 240, a manipulation panel 23 is disposed at the front side thereof. Speaker holes 240A, for audio output, are formed in the vicinity of the manipulation panel 23.

An opening 211 extended over two side face portions 21B and 22B is formed at the side face portion 210, which is at a right side viewed from the front side. Here, a main substrate 51 and an interface substrate 52, described below, are disposed in the external case 2. A connection portion 51B mounted on the main substrate 51 and a connection portion 52A mounted on the interface substrate 52 are exposed to the outside through an interface panel 53 disposed in the opening 211. At these connection portions 51B and 52A, external electronic devices or the like are connected to the projector 1.

In the front face portion 220, a circular opening 221 extended over two front face portions 21C and 22C is formed at the vicinity of the manipulation panel 23 at the right side viewed from the front.

A projection lens 46 as a projection optical system is disposed corresponding to the opening 221 inside the external case 2. At this time, a front-end portion of the projection lens 46 is exposed from the opening 221 to the exterior. A focus operation of the projection lens 46 is carried out manually using a lever 46A which is a part of the exposed portion.

In the front face portion 220, an exhaust outlet 222 is formed at the opposite position of the opening 221. A safety cover 222A is formed at the exhaust outlet 222.

As shown in FIG. 2, in the rear face portion 230, a rectangular opening 231 is formed at the right side, viewed from the rear face, so that an inlet connector 24 is exposed from the opening 231.

In the bottom face portion 250, a rectangular opening 251 is formed at a center position of a right end viewed from the bottom. A lamp cover 25 covering the opening 251 is disposed detachably in the opening 251. Detaching the lamp cover 25 from the opening 251 results in the easy replacement of a light source lamp that is not shown.

In the bottom face portion 250, a further inwardly recessed rectangular plane 252 is formed at an corner of the rear face side at a left side viewed from a bottom. An inhalation port 252A to admit cooling air from the exterior is formed in this rectangular plane 252. An inhalation port cover 26 to cover the rectangular plane 252 is disposed detachably at the rectangular plane 252. An opening 26A corresponding to the inhalation port 252A is formed in the inhalation port cover 26. An air optical filter, which is not shown, is disposed in the opening 26A to block dust from entering the inside of the case.

Furthermore, in the bottom face portion 250, a rear leg 2R, constructing the leg portion of the projector 1, is formed at a substantially central position of the rear side. Further, front legs 2F constituting leg portions of the projector 1 are disposed at left and right corners of the front side in the bottom face portion 22A. The projector 1 is supported at three points by the rear leg 2R and the two front legs 2F.

The two front legs 2F are constructed to advance and retreat in up and down directions, respectively, and are adapted to adjust the position of a projected image by adjusting the slope (posture) in forward and backward directions and left and right directions of the projector 1.

Further, as shown in FIGS. 1 and 2, a rectangular parallelepiped concave portion 253 is formed at a substantially central position of the front side in the external case 2 to extend over the bottom face portion 250 and the front face portion 220. A cover member 27 which is slidable in forward and backward directions to cover a bottom side and a front side of the concave portion 253 is disposed in the concave portion 253. A remote controller, which is not shown, to perform the remote operation of the projector 1 is received in the concave portion 253 by the cover member 27.

Figure 3:
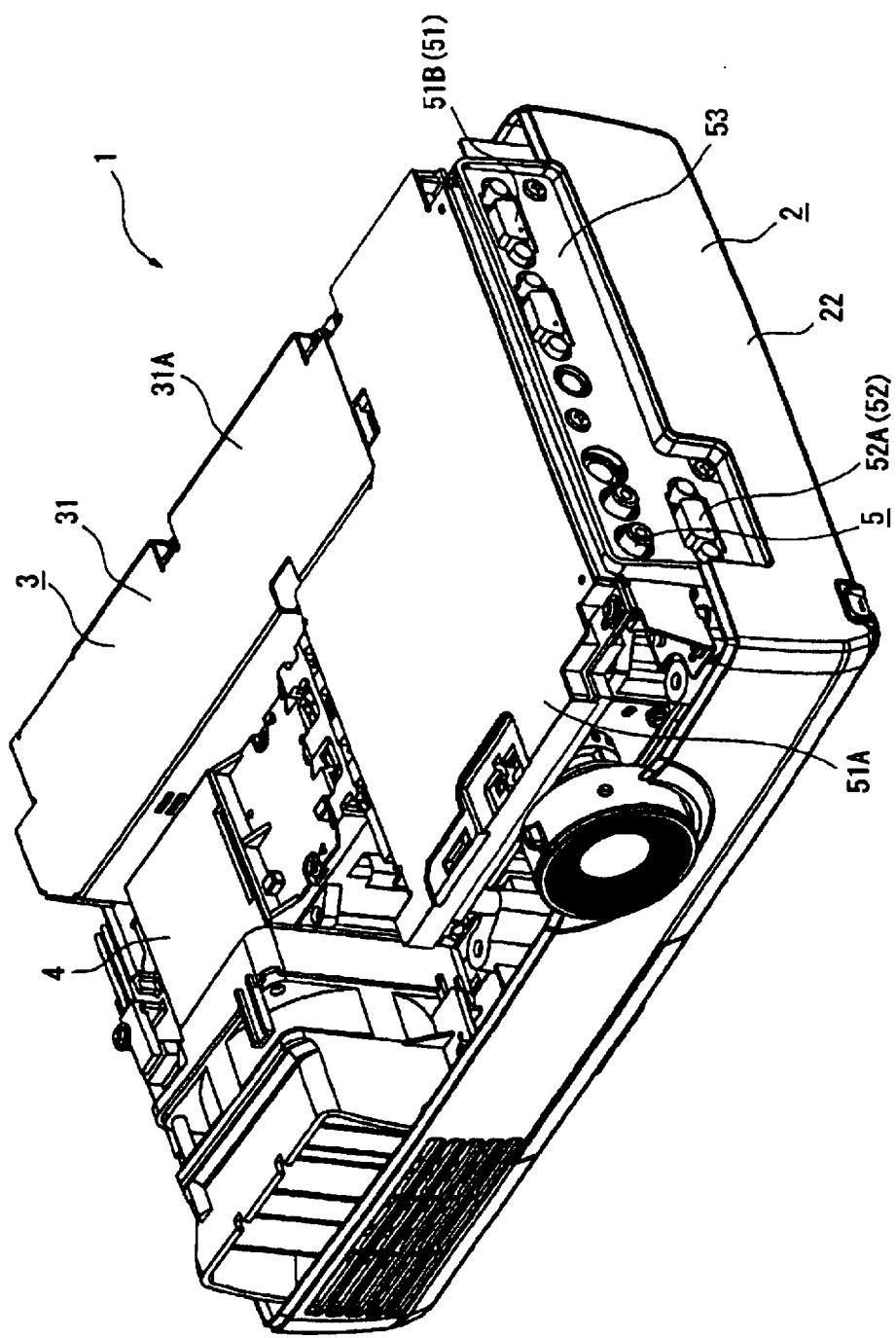
FIG. 3 is a schematic showing a state excluding an upper case from the state in FIG. 1.
Figure 4:
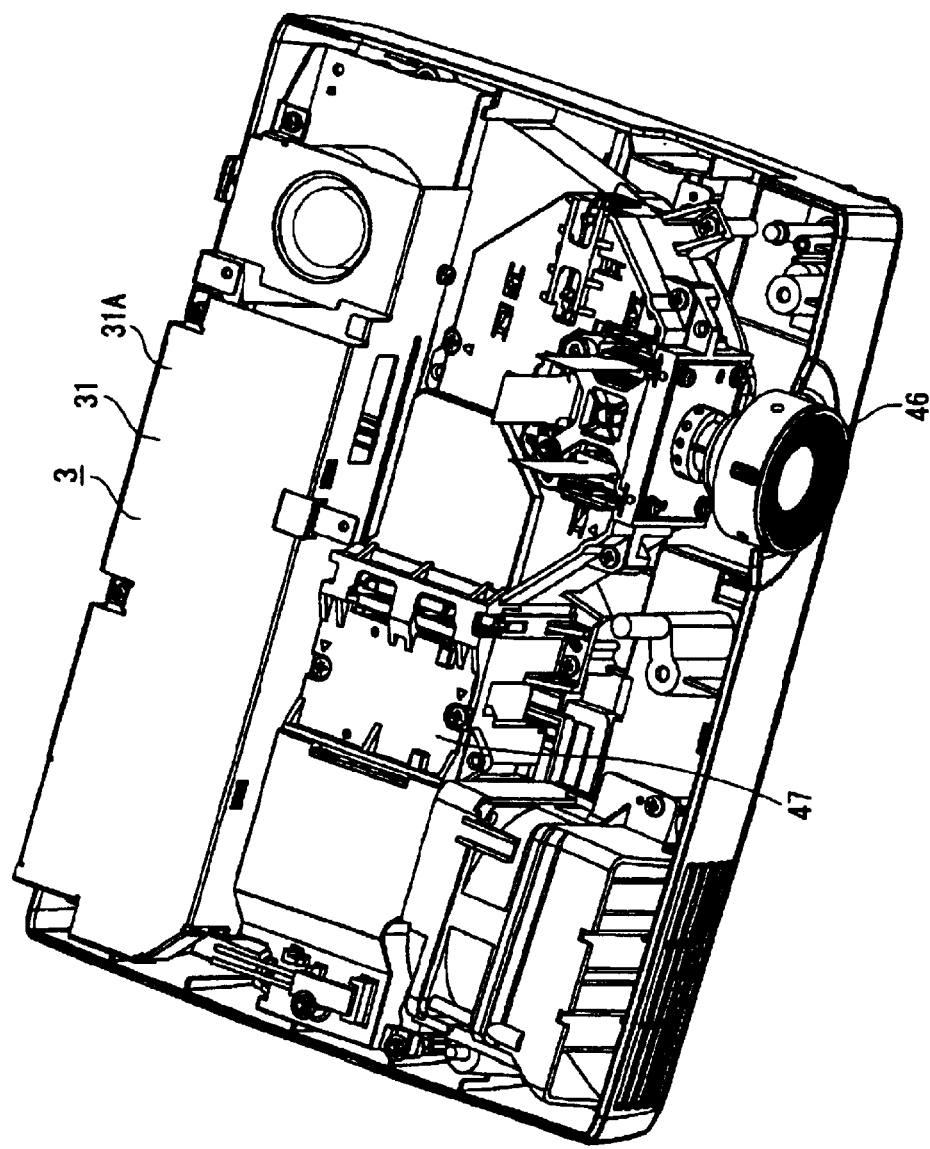
FIG. 4 is a schematic showing a state excluding a control substrate from the state in FIG. 3.

Here, FIGS. 3 and 4 are a schematics showing the inside of the projector 1. In detail, FIG. 3 shows the projector 1 with the upper case 21 eliminated from the state of FIG. 1. FIG. 4 shows the projector 1 with the control substrate 5 eliminated from the state of FIG. 3.

The external case 2 contains, as shown in FIGS. 3 and 4, a power supply unit 3 disposed along the rear face portion and extended in left and right directions, an optical unit 4 which is a substantially L-shaped in plan view, and disposed at the front side of the power supply unit 3, and a control substrate 5 disposed at the upper side and right side of the units 3 and 4. The main body of the projector 1 is composed of each of these devices 3 to 5.

The power supply unit 3 is composed of a power supply 31, and a lamp driving circuit (i.e., ballast), which is not shown, disposed at the lower portion of the power supply 31.

The power supply 31 supplies a power supplied from the exterior through a power supply cable (not shown), which is connected to the inlet connector, to the lamp driving circuit, the control substrate 5 and the like.

The lamp driving circuit supplies a power supplied from the power supply 31 to the light source lamp constituting the optical unit 4 and is not shown in FIGS. 3 and 4. The lamp driving circuit is electrically connected to the light source lamp. Such a lamp driving circuit may be configured, for example, by wiring to the substrate.

The power supply 31 and the lamp driving circuit are arranged in a substantially parallel and up and down. Spaces occupied by them are extended from a rear face of the projector 1 to left and right directions.

Further, the circumference of the power supply 31 and the lamp driving circuit is covered with a shield member 31A of a metal, such as aluminum, with opened left and right sides.

The shield member 31A has a function as a duct, inducing cooling air, and has also a function of reducing or preventing electromagnetic noise generated at the power supply 31 or the lamp driving circuit from leaking to the exterior.

A control substrate 5, as shown in FIG. 3, includes a main substrate 51 including a CPU, a connection portion 51B and the like, disposed to cover the upper portion of the units 3 and 4 and an interface substrate 52 including a connection portion 52A, disposed below the main substrate 51.

In this control substrate 5, the CPU and the like on the main substrate 51 carry out a control of a liquid crystal panel, which will be described below, constituting an optical device according to image information inputted through the connection portions 51B and 52A. The main substrate 51 is covered with the metal shield member 51A at its circumference.

2. Detail Configuration of the Optical Unit

Figure 5:
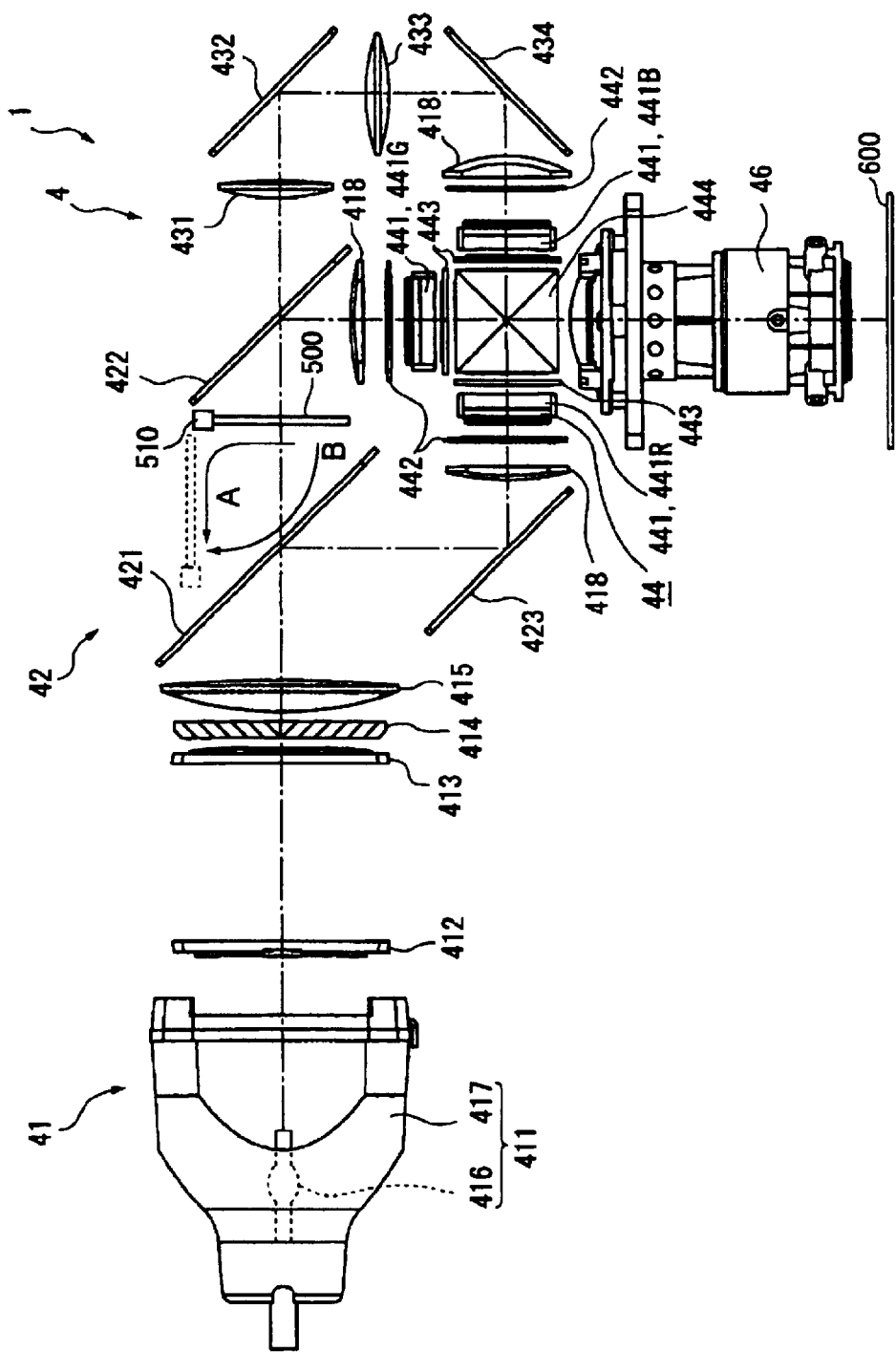
FIG. 5 is a schematic showing an optical system of a projector according to a first exemplary embodiment.

Here, FIG. 5 is a schematic showing the optical unit 4.

The optical unit 4, as shown in FIG. 5, is a unit to optically process light flux emitted from a light source lamp 416 constituting a light source device 411 to form an optical image corresponding to image information, and enlarging and projecting the optical image. The optical unit 4 includes an integrator illumination optical system 41, a color separating optical system 42, a modulating and combining optical system 44, a projection lens 46 as a projection optical system, and a synthetic resin light guide 47 (see FIG. 4) as a case to house optical components constituting the optical systems 41 to 44. The projection lens 46 is fixed to the surface of the light guide 47. Further, because the modulating and combining optical system 44 and the projection lens 46 are a key portion forming an image, these may be fixed to a structure disposed apart from the light guide 47 rather than to the light guide 47.

The integrator illumination optical system 41 is an optical system to substantially uniformly illuminate an image forming area of three liquid crystal panels 441 (liquid crystal panels 441R, 441G and 441B per a color light of red, green and blue, respectively) constituting the modulating and combining optical system 44, and includes a light source device 411, a first lens array 412, a second lens array 413, a polarization conversion element 414, and a superposing lens 415.

The light source device 411 includes a light source lamp 416 as a radiation light source and a reflector 417, reflects radial light emitted from the light source lamp 416 at the reflector 417 into parallel light and emits the parallel light to the exterior. A high-pressure discharge lamp is adopted as the light source lamp 416. Further, as the reflector 417, a parabolic mirror is adopted. Further, the combination of a parallel concave lens and an ellipsoidal mirror may be adopted instead of the parabolic mirror. Further, the light source lamp 416 will be discussed later.

The first lens array 412 has a configuration in which small lenses having a substantially rectangular contour are arranged in a matrix form viewed in a direction of an optical axis. Each small lens divides the light flux emitted from the light source lamp 416 into a plurality of partial light fluxes. The contour shape of each small lens is set to have a substantially similar figure with the shape of an image forming area of the liquid crystal panel 441.

The second lens array 413 has substantially the same configuration as that of the first lens array 412, and has a configuration in which small lenses are arranged in a matrix form. This second lens array 413 has a function to image the image of each of the small lens of the first lens array 412 on the liquid crystal panel 441 along with the superposing lens 415. Further, it is unnecessary that the contour shape of the small lens constituting the second lens array 413 has a similar figure with the shape of the image forming area of the liquid crystal panel 441. Further, the second lens array 413 needs not to have the same shape as the first lens array 412.

The polarization conversion element 414 is disposed between the second lens array 413 and the superposing lens 415. Such a polarization conversion element 414 converts the light from the second lens array 413 to one type of polarized light, therefore the use efficiency of light in the modulating and combining optical system 44 becomes higher.

In detail, finally, each of partial lights converted to one type of polarized light by the polarization conversion element 414 is substantially superposed on the liquid crystal panel 441 of the modulating and combining optical system 44 by the superposing lens 415. Because only use of one type of polarized lights is permitted in the projector 1 using the liquid crystal panel 441 of a type to modulate the polarized light, approximately half of the light flux from the light source lamp 416 to emit different types of random polarized light is not used. To this end, the light fluxes emitted from the light source lamp 416 are all converted into one type of polarized light by using the polarization conversion element 414, resulting in an increase in the efficiency of light use in the modulating and combining optical system 44. Further, such a polarization conversion element 414 is for example introduced from Japanese Unexamined Patent Application Publication No. 8-304739.

The color separating optical system 42 includes a dichroic mirror 421 as a red light component separating optical element, a dichroic mirror 422 as a green and blue color light separating optical element, a reflective mirror 423, an incident side lens 431, a relay lens 433, and reflective mirrors 432 and 434. This color separating optical system 42 has a function of separating a plurality of partial light fluxes emitted from the integrator illumination optical system 41 into three color light components of red (R), green (G) and blue (B) by the dichroic mirrors 421 and 422, and of inducing them to respective liquid crystal panels 441R, 441G and 441B.

The dichroic mirror 421 of the color separating optical system 42 separates a red light component by transmitting a green light component and a blue light component out of light fluxes emitted from the integrator illumination optical system 41 and reflecting a red light component. The red color light reflected by the dichroic mirror 421 is reflected by the reflective mirror 423 and arrives at a liquid crystal panel 441R for red color via the field lens 418. This field lens 418 converts each partial light flux emitted from the second lens array 413 into a light flux, which is parallel to a center axis (main light) thereof. It is also the same in a case where a field lens 418 is disposed at the light incident sides of the other liquid crystal panels 441R and 441G.

Further, the dichroic mirror 422 separates a light flux transmitting the dichroic mirror 421 into the green color light and the blue color light by reflecting the green color light. This separated green color light arrives at the liquid crystal panel 441G for green color via the field lens 418. The blue color light is transmitted in the dichroic mirror 422, and passes through the incident side lens 431, the relay lens 433 and the reflective mirrors 432 and 434, and also arrives at the liquid crystal panel 441B for blue color light via the field lens 418.

Further, using the incident side lens 431 and the relay lens 433 for the blue color light is intended to reduce or prevent degradation of utilization efficiency of light due to light diffusion or the like, as the optical path length of the blue color light is longer than that of the other color light. It is intended to deliver a partial light flux, incident on the incident side lens 431, to the field lens 418 as it is. Further, the relay optical system may be employed for the other color light components, not limited to the blue color light. In case that the optical path length of the red color light or green color light instead of blue color light is longer than that of the other color light components or in case that the optical path lengths of two color light are longer than that of the other color light, it is possible to reduce or prevent utilization efficiency of light from being degraded by disposing a relay optical system in the optical path of a color light having a longer length of the optical path than those of the other color light components.

Here, an optical filter 500 to remove a predetermined spectral component among the light flux transmitting through the dichroic mirror 421 is disposed between the dichroic mirror 421 and the dichroic mirror 422 constituting the color separating optical system 42. The configuration of this optical filter 500 will be discussed later.

The modulating and combining optical system 44 modulates an incident light flux according to image information to form a color image, and includes: three incident side polarizers 442 on which each color light separated in the color separating optical system 42 is incident, liquid crystal panels 441R, 441G and 441B as optical modulation devices disposed at the rear end of the respective incident side polarizers 442, emitting side polarizers 443 disposed at the rear end of the respective liquid crystal panels 441R, 441G and 441B, and a cross dichroic prism 444 as a color combining optical system.

In the liquid crystal panels 441R, 441G and 441B, for example, polysilicon TFTs are used as switching elements.

In the modulating and combining optical system 44, the respective color light components separated in the color separating optical system 42 are modulated by the three liquid crystal panels 441R, 441G and 441B, the incident side polarizer 442 and the emitting side polarizer 443 according to the image information to form an optical image.

The incident side polarizer 442 transmits only a polarized light of a certain direction of the respective color light components separated at the color separating optical system 41 and absorbs the other light fluxes, in which a polarization film is attached on a substrate of sapphire glass or the like. Further, the polarization film may be attached on the field lens 418 without using the substrate.

The emitting side polarizer 443 is also configured in substantially the same manner as the incident side polarizer 442, and transmits only a polarized light of a predetermined direction among the light fluxes emitted from the liquid crystal panels 441 (441R, 441G and 441B) and absorbs the other light fluxes. Further, a polarization film may be attached on the cross dichroic prism 444 without using the substrate.

The incident side polarizer 442 and the emitting side polarizer 443 are set up for their polarization axes to be perpendicular to each other.

The cross dichroic prism 444 combines optical images emitted from the emitting side polarizer 443 and modulated at every color light to form a color image.

In the cross dichroic prism 444, a dielectric multilayer film to reflect the red color light and a dielectric multilayer film to reflect the blue color light are disposed in a substantially X-shape along interfaces of four rectangular prisms in which three color light components are combined by these dielectric multilayer films.

The combined light emitted from a light flux-emitting side end face of the cross dichroic prism 444 enters the projection lens 46 and is enlarged and projected by the projection lens 46 toward a screen 600.

In this exemplary embodiment, on the optical path of a light flux from the light source lamp 416 to the screen 600, an angle, by which the light flux expands in a part from the light source lamp 416 to the light flux-emitting surface of the projection lens 46, is adapted to fall within 20° with respect to the illumination optical axis L. The angle, by which the light flux expands in a part from the light flux-emitting surface of the projection lens 46 to the screen 600, is about 30°, with respect to the illumination optical axis L.

3. Spectrum Property of Light Source Lamp

Figure 6:
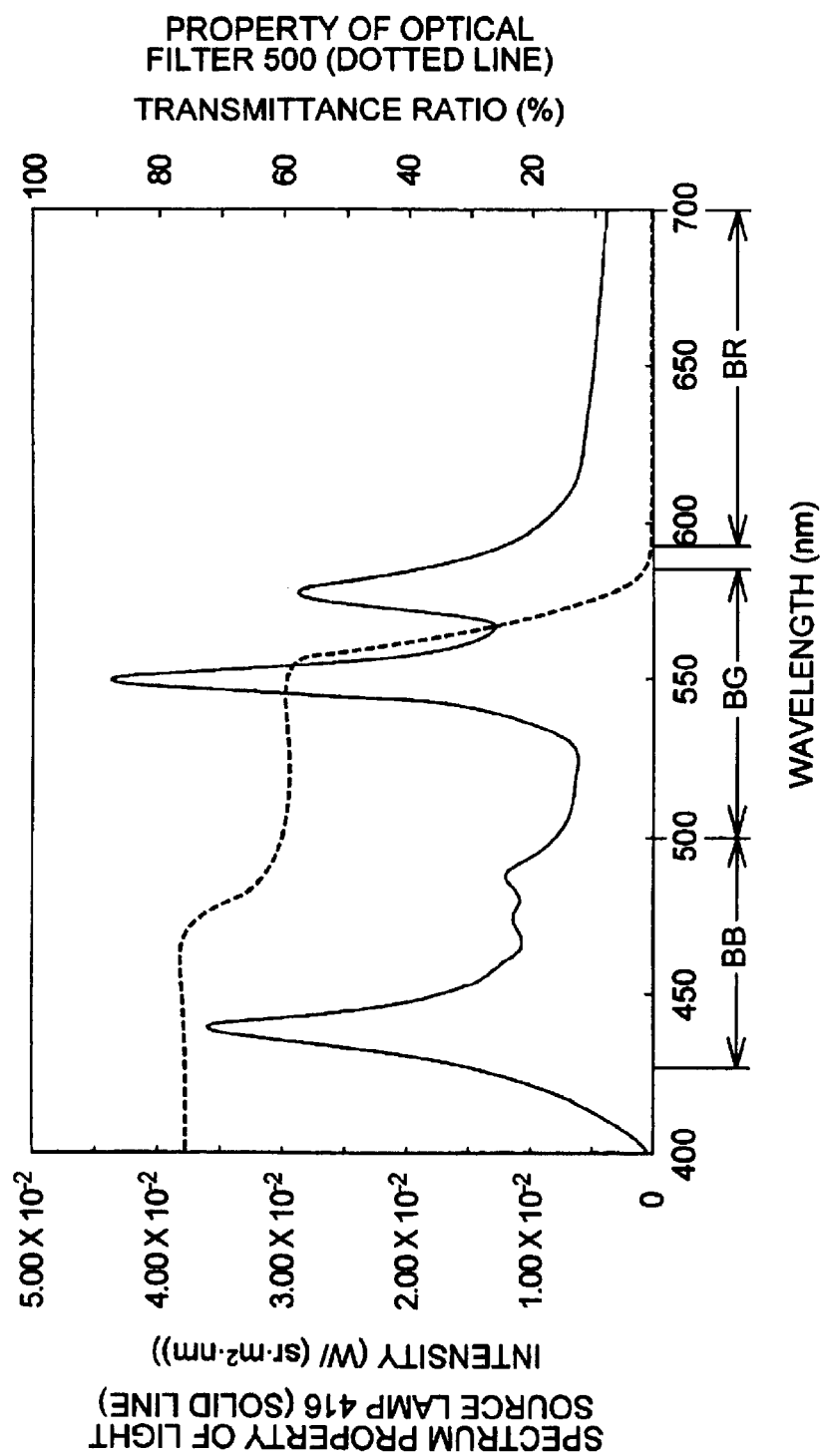
FIG. 6 is a schematic showing a spectrum property of a light source lamp and a selection property of an optical filter according to the first exemplary embodiment.

The solid line of FIG. 6 is a schematic showing the spectrum property of the 416.

In the light source lamp 416, the peak of a spectrum indicating the blue color light appears in the vicinity of wavelength of 440 nm (420 nm to 460 run. The peak of a spectrum indicating the green color light appears in the vicinity of wavelength of 550 nm (500 nm to 570 nm). The red color light does not have the same peak as the blue color light or the green color light at 600 nm to 680 nm. Further, FIG. 6 shows an example of wavelength ranges BB, BG and BR of respective color light components. The wavelength range BB of the blue color light is about 430 to 500 nm. The wavelength range BG of the green color light is about 500 to 580 nm. The wavelength range BR of the red color light is about 590 to 700 nm. At this time, the intensity of the red color light (light quantity of wavelength range BR of the red color light) is about 60% of the intensity of green color light (light quantity of the wavelength range BG of the green color light). The intensity of the blue color light (light quantity in wavelength range BB of the blue color light) is about 90% of intensity of the green color light (light quantity of wavelength range BG of the green color light).

4. Configuration of the Optical Filter

The dotted line of FIG. 6 represents the selection property of the optical filter 500 when light is incident to the optical filter 500 at 0°, specifically, when the light is incident in a normal direction of the optical filter 500. The optical filter 500, as shown in a dotted line of FIG. 6, reflects a predetermined spectrum of the incident light flux, specifically, a predetermined ratio of light of a wavelength range BG of the green color light and a wavelength range BB of the blue color light, and transmits remaining light as it is. It reflects all lights in the wavelength range BR of the red color light. Although the configuration of this optical filter 500 is not shown, the optical filter 500 includes a glass substrate composed of blue plate glass, white plate glass, or the like, and a dichroic film in which two types of thin film, having different indexes of refraction, are alternately laminated on the surface of the glass substrate. Further, the substrate of the optical filter 500 may be of a material, such as plastic or the like, not glass. Further, the type of the thin film constituting the dichroic film may be two or more types.

In this exemplary embodiment, in particular, because green color and blue light components having high intensity are target to be corrected, a ratio, by which a green light component and a blue light component are removed, may be determined based on a color light other than a target to be corrected, namely, a red light component. A ratio by which green and blue light components are removed is determined so that desired color balance is realized based on a red light component which is a color light having relatively low intensity. When a lamp having a green or blue color light with relatively high intensity, such as a very high-pressure mercurial lamp is used as a light source lamp 416, a ratio which eliminates the other color light components is determined based on a red light component having relatively low intensity, as described above. When a lamp having a red light component with relatively high intensity, such as a metal halide lamp, is used as the light source lamp 416, it suffices to determine a ratio by which a red light component is removed so that desired color balance is realized based on a blue or green color light with relatively low intensity.

In this exemplary embodiment, an optical filter 500 is thus disposed to reflect a predetermined spectral component. The optical filter 500 is used to remove a portion of a component of a color light having a relatively high intensity among components of three color light components emitted from the light source lamp. Thus, it is possible to reduce or prevent the contrast of a projected image from being degraded.

In this exemplary embodiment, this optical filter 500 is disposed at a position where an angle by which a light flux expands, falls within 20° with respect to an illumination optical axis L. Thus, it is possible to make a difference of an incident angle with respect to the light flux-incident surface of the optical filter 500 between a light flux forming an end portion of the projection optical image and a light flux forming a center portion thereof to be smaller, thereby reducing color unevenness of the projected image. Hereinafter, this effect will be discussed in more detail.

Figure 7:
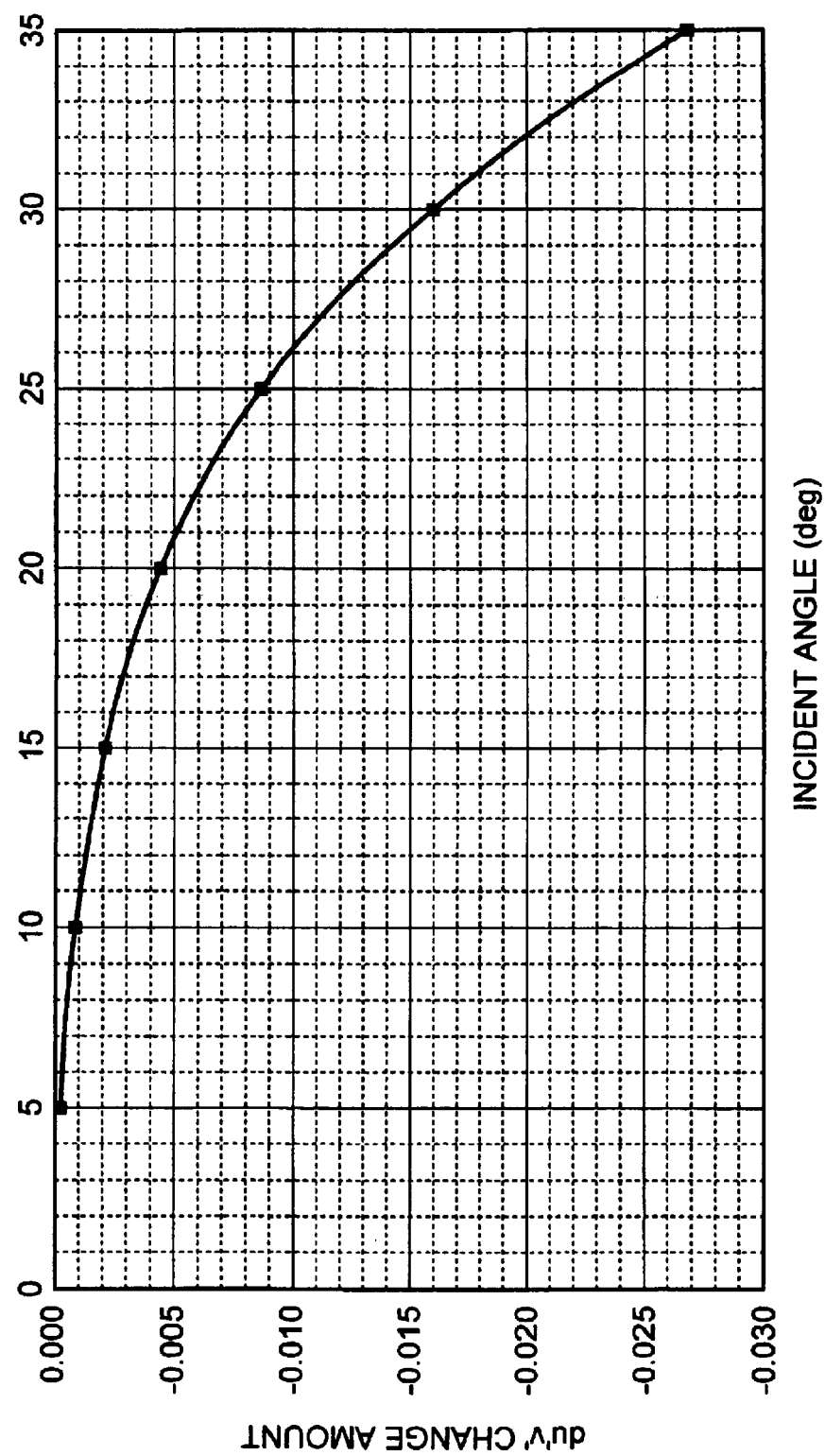
FIG. 7 is a schematic showing change amount of a color deviation du'v' to an angle change of light with respect to an illumination optical axis L.

FIG. 7 shows the change amount of color deviation du'v' to the change of an angle of light with respect to an illumination optical axis L. It shows the change amount of the color deviation du'v' at 5° intervals in a range of 0° to 35° in which a color deviation value is 0 when an angle of light incident to the optical filter 500 is 0° with respect to the illumination optical axis L. The color deviation du'v' of FIG. 7 shows a degree by which an image color of a white color displayed on a projecting face is separated from a chromaticity coordinate locus of a black body radiation when light is incident to the optical filter 500 at a predetermined incident angle. As shown in this figure, the change amount of the color deviation du'v' is relatively small in a range of 0° or more to 20° or less, while it is rapidly larger over 20°.

Figure 8:
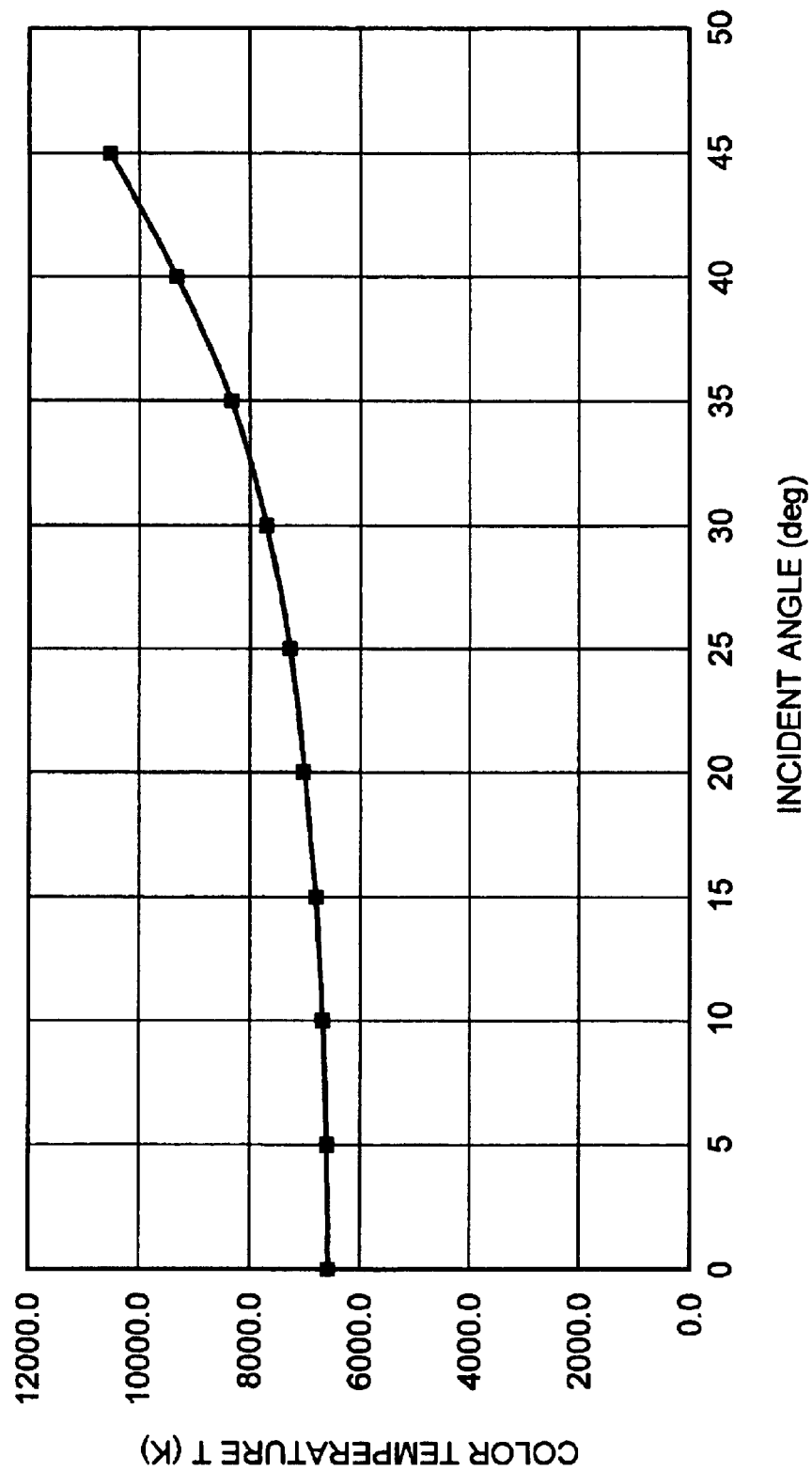
FIG. 8 is a schematic showing a color temperature change to an angle change of light with respect to an illumination optical axis L.

FIG. 8 shows color temperature change to the angle change of light with respect to an illumination optical axis L. The color temperature of FIG. 8 illustrates a color temperature of a white color image displayed on a projected face when light is incident to the optical filter 500 at a predetermined incident angle. As shown in this figure, the color temperature is not substantially changed in a range of 0° or more to 20° or less while it is rapidly changed over 20°.

From the above, it can be seen that if the light is incident to the optical filter 500 at an angle more than 20° with respect to the illumination optical axis L, a color greatly different from a color which is in essence desired to be represented on a projecting face, appears. Thus, disposing the optical filter 500 at a position where an angle with respect to the illumination optical axis L by which the light flux expands, exceeds 20°, makes color unevenness on a projected image to be easily recognized. It can be seen that if the light is incident to the optical filter 500 at an angle within 20° with respect to the illumination optical axis L, a color that is in essence desired to be displayed on a projecting face appears. In this exemplary embodiment, because the optical filter 500 is disposed at a position where an angle by which the light flux expands, falls within 20° with respect to the illumination optical axis L, the color unevenness of the projected image is not substantially recognized by a viewer, and the color unevenness can be reduced effectively.

Further, in this exemplary embodiment, the optical filter 500 is disposed between the dichroic mirror 421 and the dichroic mirror 422, specifically, on an optical path of light (light mixed with green and blue light components) obtained by excluding the red color light, not requiring correction, from the light emitted from the light source. Thus, it is possible to correct only the spectrum for a minimum of the color light requiring correction, specifically, the green color light and the blue color light. Further, spectrum corrections of the green color light and the blue color light can be simultaneously carried out with one optical filter 500, thereby simplifying its structure.

The spectrum corrected light flux is incident to the liquid crystal panels 441G and 441B, thereby reducing the likelihood or preventing the liquid crystal panels 441G and 441B from being overheated.

Further, the optical filter 500 may be configured by two filters of an optical filter to carry out spectrum correction of a green light component, and an optical filter to carry out spectrum correction of a blue light component. Further, if the optical filter is composed of two optical filters, the optical filter to carry out the spectrum correction of the green color light may be disposed on the optical path (on an optical path between the dichroic mirror 422 and the dichroic prism 444) of the green color light separated by a dichroic mirror 422. The optical filter to carry out the spectrum correction of the blue color light may be disposed on the optical path (on an optical path between the dichroic mirror 422 and the dichroic prism 444) of the blue color light separated by the dichroic mirror 422.

The above optical filter 500 is moved into and out of the optical path of the light flux by the moving mechanism 510 disposed at the light guide 47 (see FIG. 5).

The optical filter 500 is disposed on the illumination optical axis L to be substantially perpendicular to the illumination optical axis L. From this state, the moving mechanism 510, as indicated by an arrow A of FIG. 5, slides the optical filter 500 out of the optical path by allowing a side 503, which is closer to the optical component 422 downstream in the optical path from the optical filter 500 and also is remoter from the optical component 421 at the upstream of the optical path from the optical filter 500, from among the two sides of the optical filter 500 perpendicular to a plane (corresponding to the plane of the figure in the configuration of FIG. 5) formed by the illumination optical axis L, to be moved upstream in the optical path and by allowing a side 504, at the opposite side, to be positioned downstream in the optical path. The moving mechanism 510 may be a mechanism to rotate an opposite side 504 as indicated by an arrow B of FIG. 5 using, as a axis, the vicinity of a side 503 which is closer to the optical component 422 downstream in the optical path from the optical filter 500 and remoter from the optical component 421 upstream in the optical path from the optical filter 500, from among the two sides of the optical filter 500 perpendicular to a plane (corresponding to the plane of the figure in the configuration of FIG. 5) formed by the illumination optical axis L.

If it is moved by the former configuration, moving the optical filter 500 can be realized in a smaller space than the latter. Thus, this is advantageous to minimize an optical system and further a projector. If it is moved by the latter configuration, the moving mechanism 510 has a simpler configuration than that of the former. Thus, this is advantageous in manufacturing easiness and cost.

Further, the moving mechanism 510 may be a manual mechanism or an automatic mechanism.

Thus, in this exemplary embodiment, because the moving mechanism 510 is disposed in the light guide 47 to move the optical filter 500 into and out of the optical path of the light flux, the optical filter 500 is retreated onto the optical path in business use and the optical filter 500 is moved onto the optical path in home use, thereby obtaining a proper projected image according to utilization purpose.

B. Second Exemplary Embodiment

A projector according to the second exemplary embodiment of the present invention is different from the projector 1 according to the first exemplary embodiment only in the arrangement of the optical filter 500A and selection property, and is substantially the same as the projector 1 according to the first exemplary embodiment in the other configurations. To this end, same reference numerals are given to the same and similar components as the first exemplary embodiment and the explanation thereon will be omitted or simplified.

Figure 9:
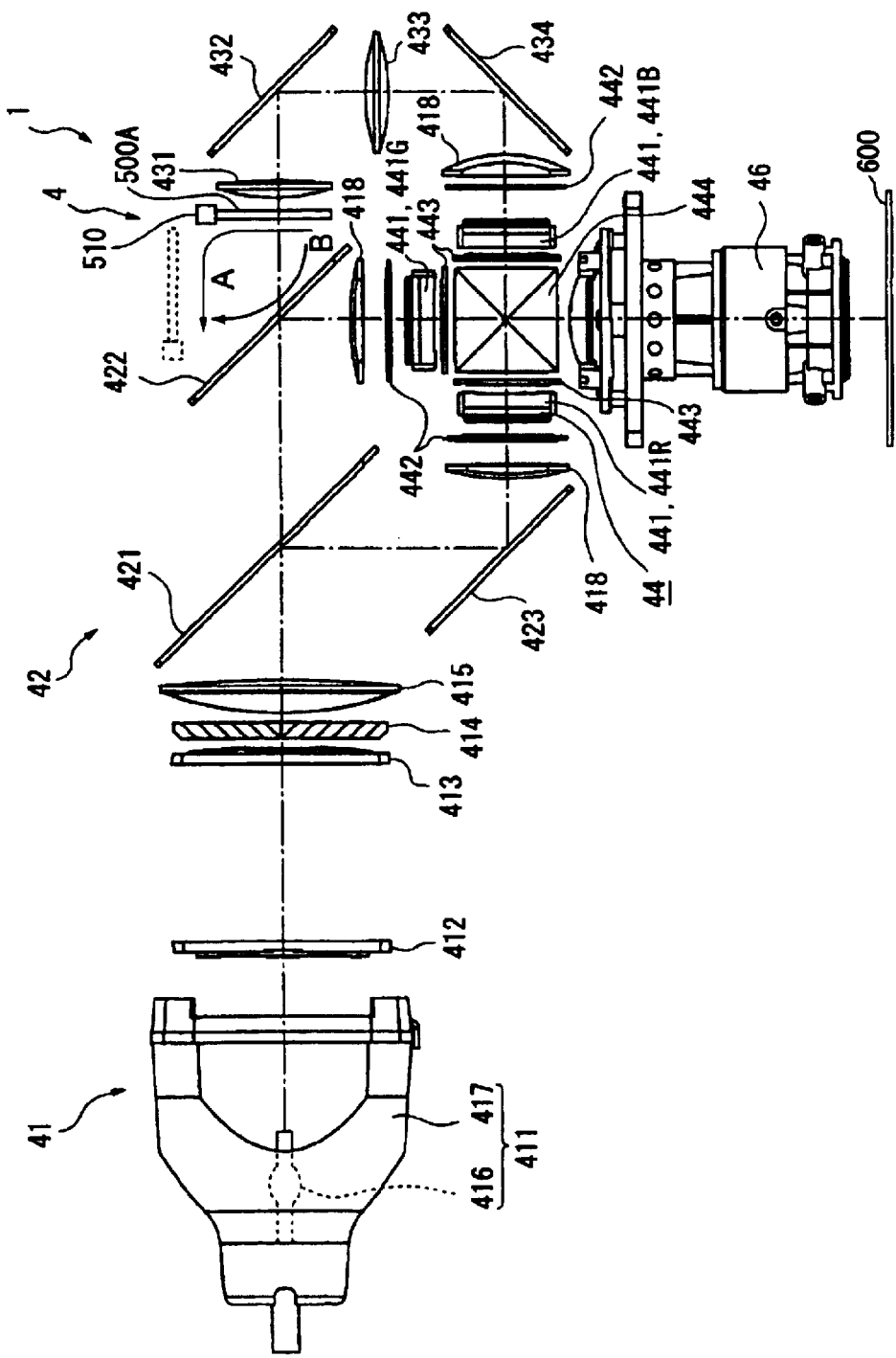
FIG. 9 is a schematic showing an optical system of a projector according to a second exemplary embodiment of the present invention.
Figure 10:
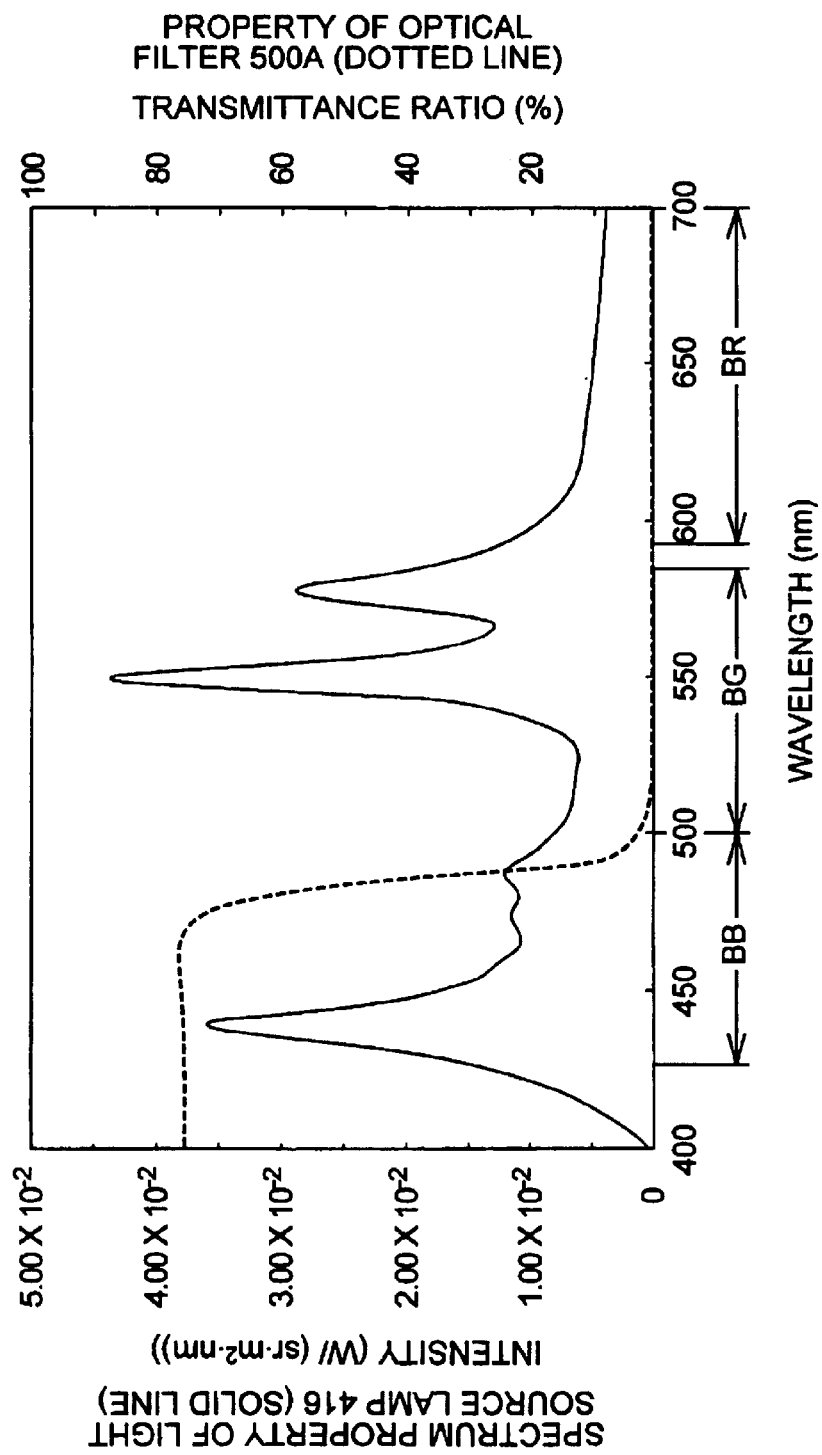
FIG. 10 is a schematic showing a spectrum property of a light source lamp and a selection property of an optical filter according to the second exemplary embodiment of the present invention.

FIG. 9 is a schematic showing an optical system of a projector according to the second exemplary embodiment of the present invention. Further, the solid line of FIG. 10 is a schematic showing the spectrum property (the same property as indicated by the solid line of FIG. 6) of the light source lamp 416. The dotted line of FIG. 10 shows the selection property of the optical filter 500A when light is incident to the optical filter 500A at 0°. Specifically, when light is incident in a direction normal to the optical filter 500A.

The optical filter 500A is disposed between the dichroic mirror 422 and the incident side lens 431 constituting the color separating optical system 42. The optical filter 500A, as indicated by a dotted line of FIG. 10, reflects a predetermined spectrum of an incident light flux, specifically, a predetermined ratio of a light in a wavelength range BB of the blue color light, and transmits the remaining portion as it is. Light in a wavelength range BR of the green color light and the red color light is all reflected.

With this exemplary embodiment, the optical filter 500A to reflect a predetermined spectral component is disposed as in the first exemplary embodiment. By the optical filter 500A, some components of a blue light component having relatively high intensity is removed among components of three color light components emitted from the light source lamp. Thus, it is possible to reduce color unevenness by reducing or preventing the contrast degradation of the projected image. Further, it is possible to obtain proper projected image according to utilization purpose by manipulation of the moving mechanism 510.

Furthermore, in this exemplary embodiment, because the optical filter 500 is disposed between the dichroic mirror 422 and the incident side lens 431, it is possible to enhance the life span of the liquid crystal panels 441R, 441G and 411B, which is short for light of a short wavelength, by correcting only the spectrum for the blue color light among the light fluxes separated from the color separating optical system 42.

Further, since the spectrum corrected light flux is incident into the liquid crystal panel 441B, overheating of the liquid crystal panel 441B is prevented or the likelihood reduced.

Further, the moving mechanism 510A may be a manual mechanism or an automatic mechanism.

C. Third Exemplary Embodiment

A projector according to a third exemplary embodiment of the present invention is different from the projector 1 according to the first exemplary embodiment only in the arrangement of an optical filter 500B and a moving mechanism 510B, and the selection property and configuration, and is substantially the same as that of the first exemplary embodiment in the other configurations. For this reason, same reference numerals are given to the same and similar components of the first exemplary embodiment and the explanation thereon will be omitted or simplified.

Figure 11:
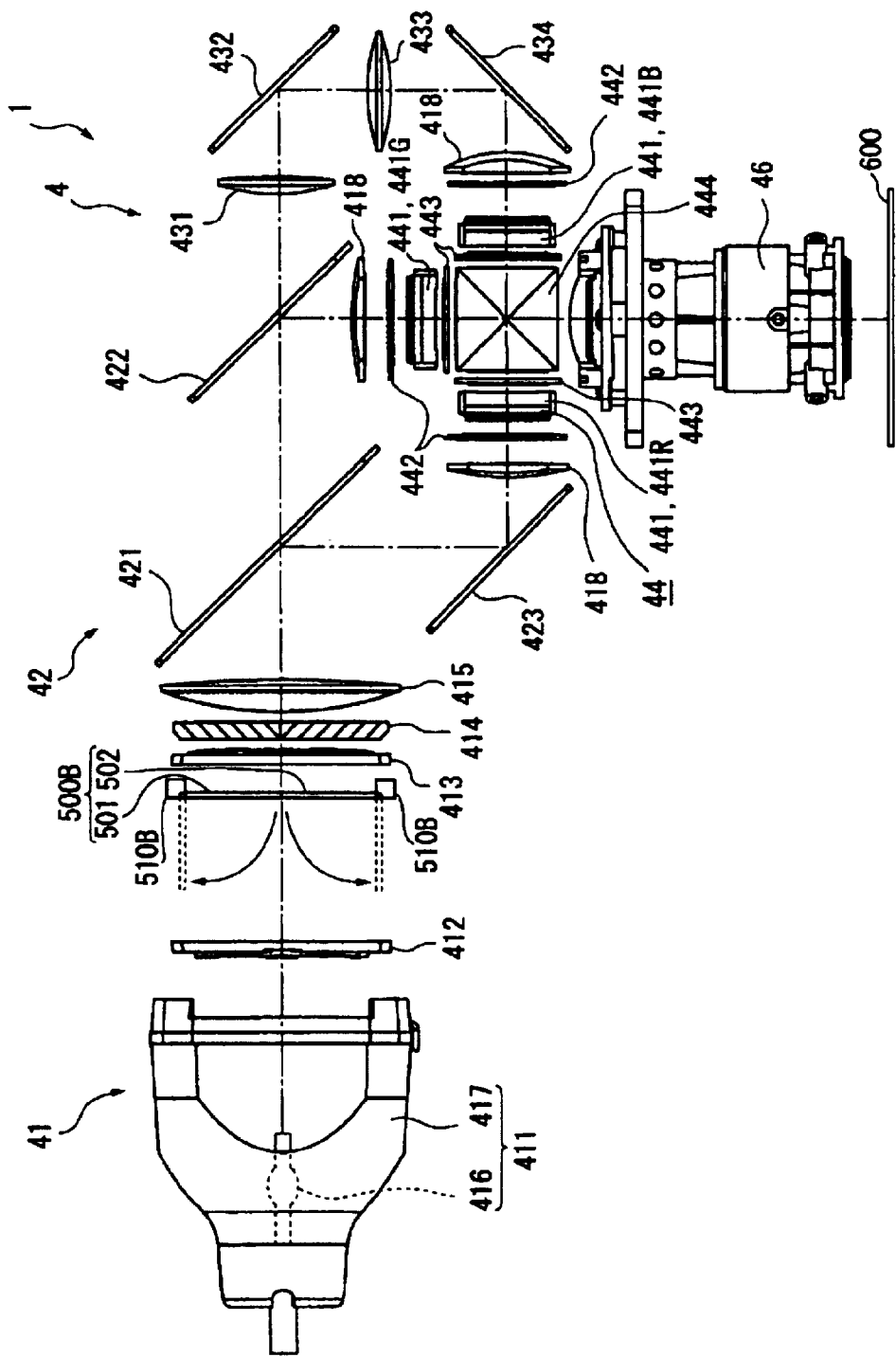
FIG. 11 is a schematic showing an optical system of a projector according to a third exemplary embodiment of the present invention.
Figure 12:
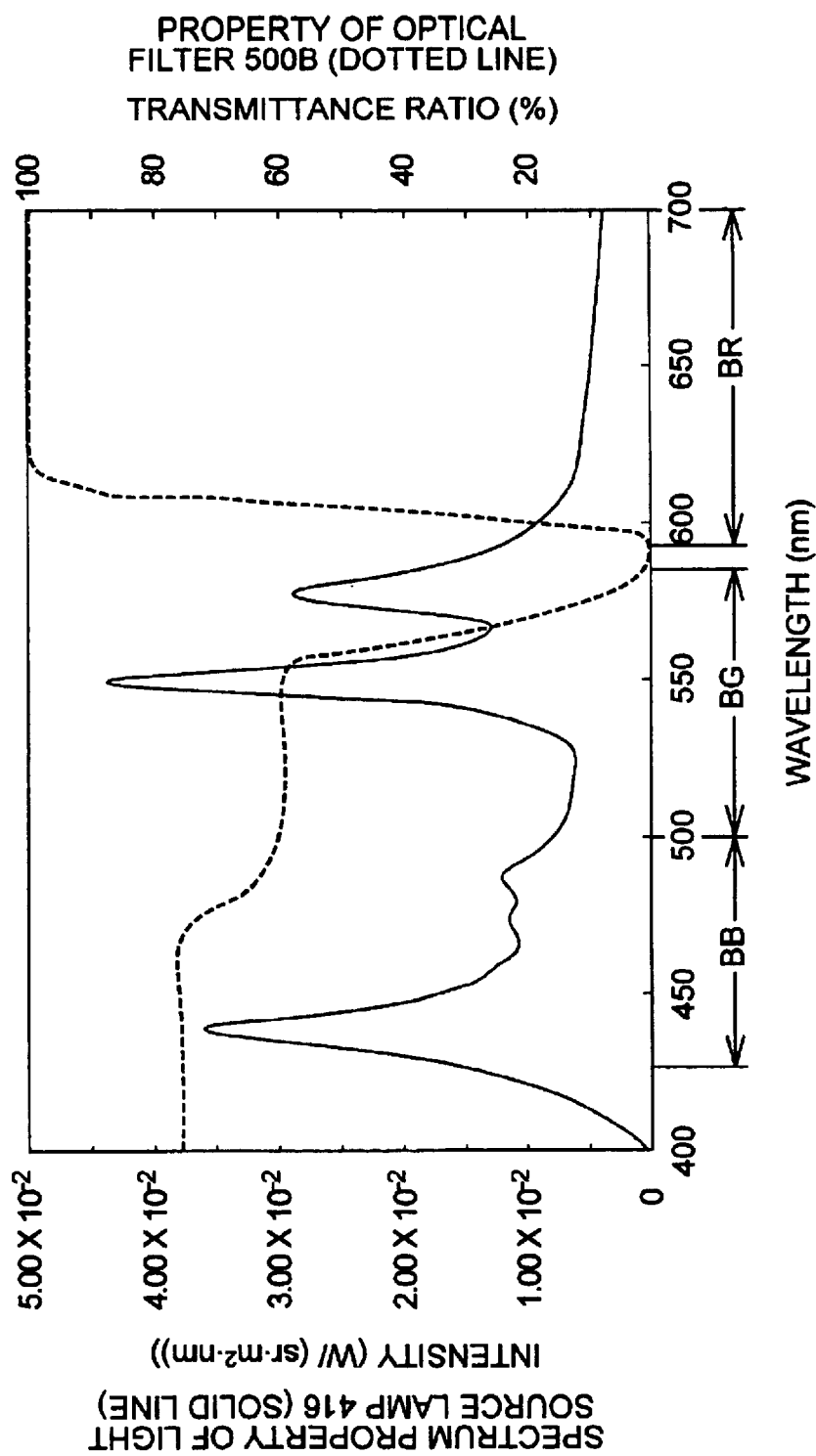
FIG. 12 is a schematic showing a spectrum property of a light source lamp and a selection property of an optical filter according to the third exemplary embodiment of the present invention.

FIG. 11 is a schematic showing an optical system of a projector according to the third exemplary embodiment of the present invention. Further, the solid line of FIG. 12 is a schematic showing the spectrum property (the same property as indicated by the solid line of FIG. 6) of the light source lamp 416. The dotted line of FIG. 12 shows the selection property of the optical filter 500B when light is incident on the optical filter 500B at 0°. Specifically, when light is incident in a direction normal to the optical filter 500B.

The optical filter 500B is disposed between the light source device 411 and the color separating optical system 42, here, between the first lens array 412 and the second lens array 413. The optical filter 500B, as indicated by the dotted line of FIG. 12, reflects a predetermined spectrum of an incident light flux, specifically, a predetermined ratio of light in the wavelength range BB of the blue color light and light of the wavelength range BG of the green color light and transmits the remaining portion as it is. The lights in the wavelength range BR of the red color light are all substantially transmitted. This optical filter 500B is divided into two optical filter members 501 and 502 at its center portion. The moving mechanism 510B opens and closes the respective optical filter members 501 and 502 in the form of double doors by using both end portions of the optical filter 500B as shafts.

With this exemplary embodiment, as in the first exemplary embodiment, it is possible to reduce or prevent the contrast degradation of the projected image and to reduce color unevenness. Further, it is possible to obtain a proper projected image according to utilization purpose by the manipulation of moving mechanism 510C.

Furthermore, in this exemplary embodiment, because the light flux passes through the optical filter 500C before the light flux from the light source device 411 is separated into a plurality of color light components, the spectrum of all color light components of the red color light, the green color light, and the blue color light can be corrected, thereby obtaining high definition projected image.

Further, since the spectrum corrected light flux is incident to the liquid crystal panels 441R, 441G and 441B, overheating of the liquid crystal panels 441R, 441G and 441B can be prevented or the likelihood reduced.

Further, although, in this exemplary embodiment, the optical filter 500B is divided into two optical filter members 501 and 502 at a center portion thereof, an undivided optical filter may be used as shown in the first or second exemplary embodiment. In case that the undivided optical filter is thus used, it is possible to adopt the moving mechanism as in the first or second exemplary embodiment.

Further, the moving mechanism 510B may be a manual mechanism or an automatic mechanism.

D. Fourth Exemplary Embodiment

A projector according to a fourth exemplary embodiment of the present invention is different from the projector 1 according to the first exemplary embodiment only in the arrangement of an optical filter 500C and a moving mechanism 510C, and the selection property and configuration, and is substantially the same as that of the first exemplary embodiment in the other configurations. For this reason, same reference numerals are given to the same and similar components to the first exemplary embodiment and the explanation thereon will be omitted or simplified.

Figure 13:
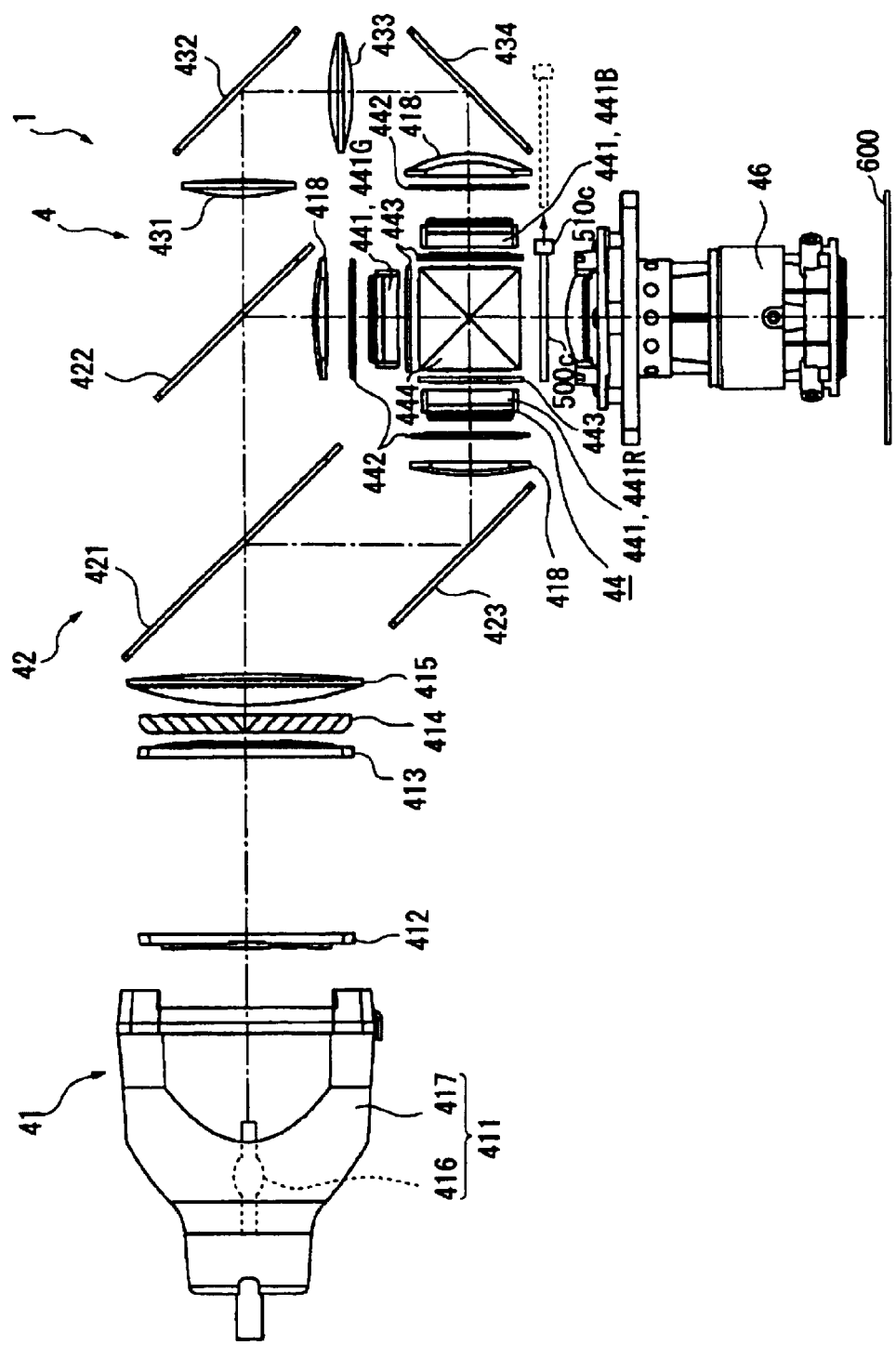
FIG. 13 is a schematic showing an optical system of a projector according to a fourth exemplary embodiment of the present invention.

FIG. 13 is a schematic showing an optical system of a projector according to a fourth exemplary embodiment of the present invention. The selection property of the optical filter 500C is the same as that of the optical filter 500B of the third exemplary embodiment as indicated in a dotted line of FIG. 12. The spectrum property of the light source lamp 416 is also the same as indicated by a solid line of FIG. 6 or the like.

The optical filter 500C is disposed between the cross dichroic prism 444 and the projection lens 46, and the moving mechanism 510C slides the optical filter 500C inwardly of its surface.

With this exemplary embodiment, it is possible to reduce or prevent a contrast degradation of a projected image and reduce color unevenness, as in the first exemplary embodiment. Further, it is possible to obtain a proper projected image according to utilization purpose by manipulation of the moving mechanism 510B.

Furthermore, in this exemplary embodiment, a combined light combined by the cross dichroic prism 444 passes through the optical filter 500B to allow all color light components of a red light component, a green light component and a blue light component to be spectrum-corrected, thereby obtaining a high definition projected image.

Further, the moving mechanism 510C may be a manual mechanism or an automatic mechanism.

E. Fifth Exemplary Embodiment

A fifth exemplary embodiment of the present invention discloses a moving mechanism realizing the rotational locus indicated by the arrow A of FIG. 5 among the rotational locus of the optical filter as described in the first embodiment. Thus, the position and the other configurations of the moving mechanism 510D in the optical system of the projector are substantially the same as those of the first exemplary embodiment. For this reason, same reference numerals are given to the same and similar components to the first exemplary embodiment and the explanation thereon will be omitted or simplified.

Figure 14:
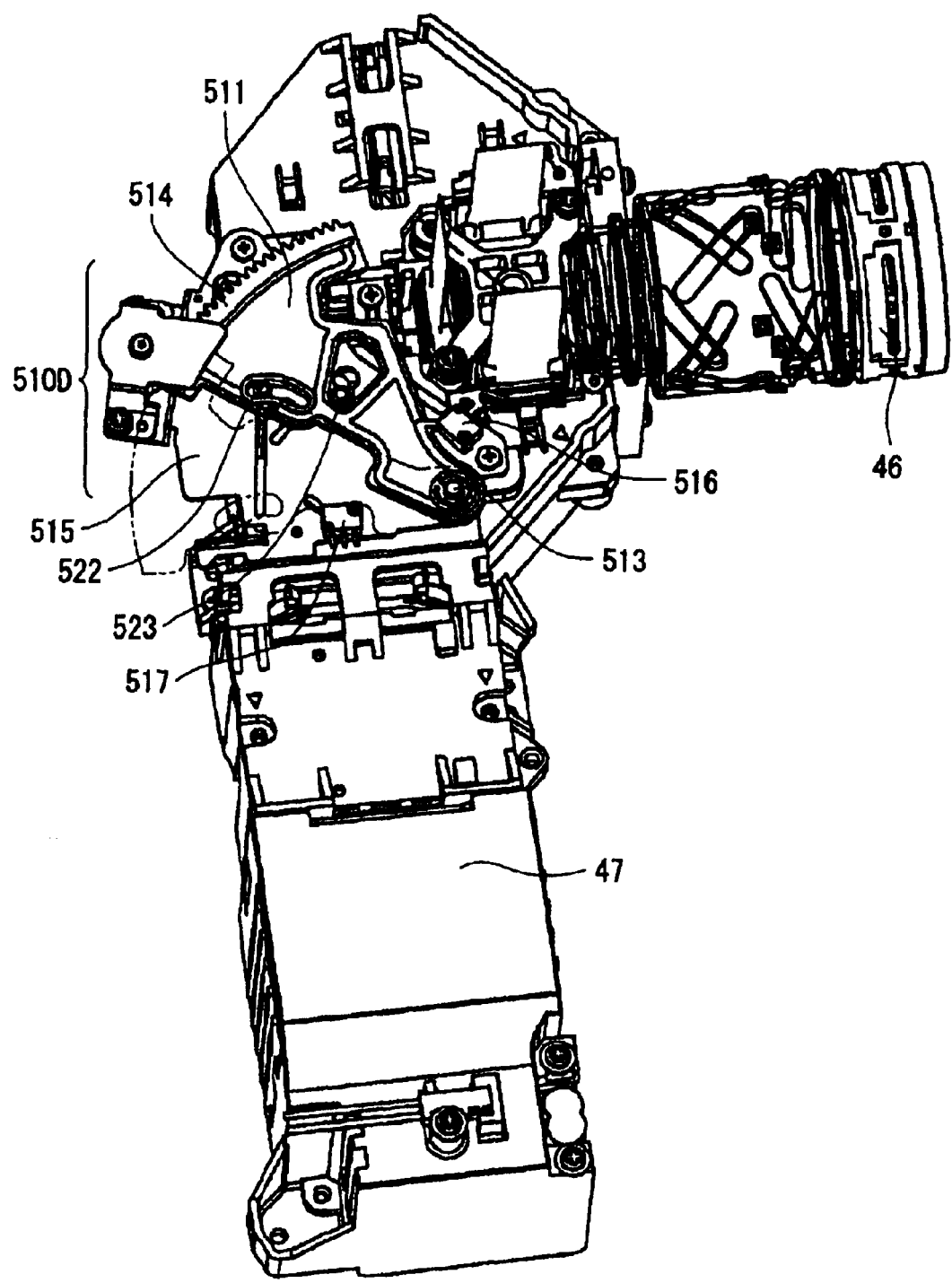
FIG. 14 is a schematic of optical system of a projector according to a fifth exemplary embodiment of the present invention viewed from the top.

FIG. 14 is a schematic showing a configuration, viewed from a top, in which a moving mechanism 510D is assembled into a light guide 47 according to the fifth exemplary embodiment of the present invention. In this light guide 47, an integrator illumination optical system 41, a color separating optical system 42, and a modulating and combining optical system 44 are received, as in the first embodiment. Further, the projection lens 46 is fixed to the surface of the light guide 47.

Further, because the modulating and combining optical system 44 and the projection lens 46 are key portions forming an image as described in the first exemplary embodiment, these may be also fixed to a structure disposed apart from the light guide 47 rather than to the light guide 47.

Figure 15:
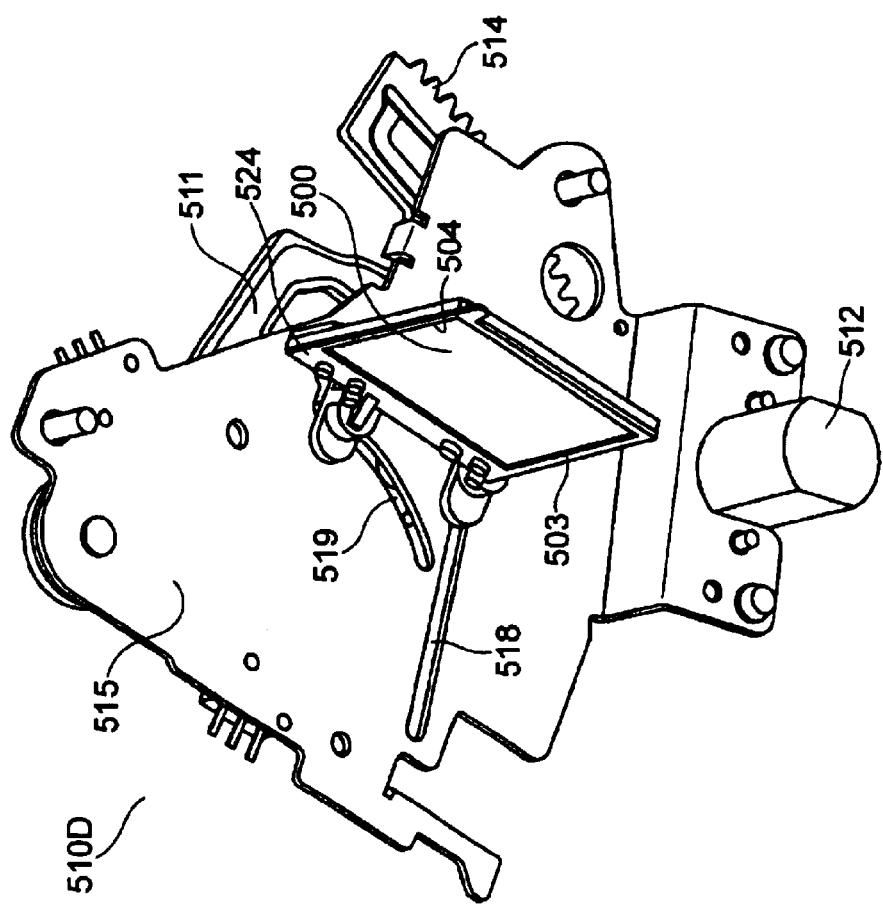
FIG. 15 is a schematic of a moving mechanism of a projector according to the fifth exemplary embodiment of the present invention viewed from the bottom.
Figure 16:
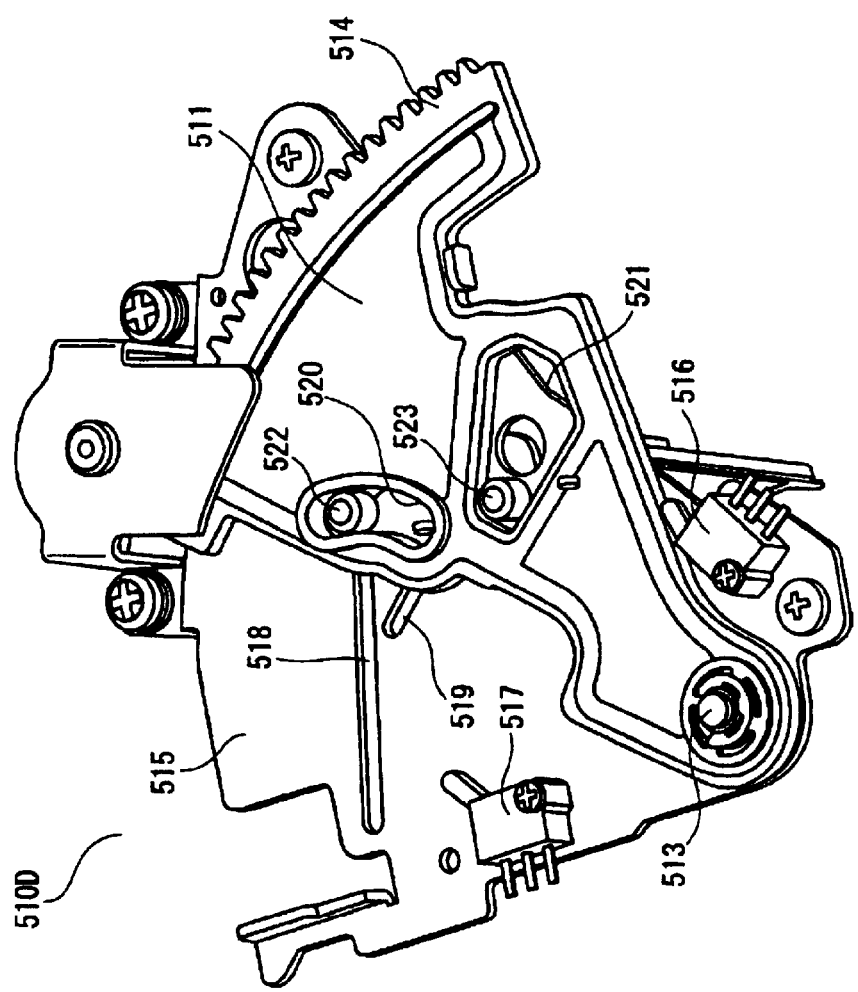
FIG. 16 is a schematic of a moving mechanism of a projector according to the fifth exemplary embodiment of the present invention viewed from the top.

Further, in this exemplary embodiment, the optical unit as shown in FIG. 5 is adopted, and the optical filter 500 is disposed between a dichroic mirror 421 as a red light component separating optical element in the color separating optical system 42 and a dichroic mirror 422 as a green and blue color light separating optical element. Thus, although details thereon will be discussed below, a moving mechanism 510D to move the optical filter 500 into and out of the optical path of the light flux is disposed to cover a upper face in the vicinity of the color separating optical system 42 received in the light guide 47, as shown in FIG. 14. FIG. 15 is a schematic of the moving mechanism 510D according to the fifth exemplary embodiment of the present invention viewed from a bottom, FIG. 16 is a schematic of this moving mechanism 510D viewed from a top.

The moving mechanism 510D is a mechanism to rotate the optical filter 500, and includes a base portion 515, a rotating portion 511, a driving motor 512, rotating end detecting portions 516 and 517, and a filter frame 524.

The base portion 515 is configured as a metal plate shaped body mounted on an upper surface of the above-described light guide 47. This base portion 515 has two guide grooves along the rotational locus of the optical filter 500 passing through it at an approximate center portion thereof to guide retaining portions 522 and 523 of the filter frame 524, which will be described below.

Furthermore, a rotational shaft support 513 is disposed at the end portion of the base portion 515 to support the rotating portion 511 rotatably.

The rotating portion 511 is a fan-shaped member, and has a rack portion 514 formed at the circular arc portion of a fan, an engagement groove 520 of which one side is passed through, an engagement groove 521 of which the other side is passed through, and a rotational shaft hole into which a rotational shaft of the rotational shaft support 513 is inserted, which is not shown. Although the engagement grooves 520 and 521 will be described below, they engage with protrusion shaped retaining portions 522 and 523 of the filter frame 524, respectively.

Here, since the rotating portion 511 is rotatably supported on one end of the base portion 515 in the rotational shaft support 513 and at the same time, the rack portion 514 held by the rotating portion 511 is engaged with the pinion of the driving motor 512 as described below, the rotational movement of the driving motor 512 is delivered to the rack 514 and thus rotating portion 511 is rotated about the rotational shaft support 513 in one direction.

The driving motor 512 is a direct motor that can be forwardly and reversely rotated by the conversion of a direct current, and although not shown, a pinion engaged with the rack portion 514 is supported in a bind at the rotational shaft end.

As a timing of initiating the rotation of this driving motor 512, for example, a switch manipulation to change the position of the optical filter 500, or an image quality mode selection signal of the projected image, and a predetermined manipulation signal of a projector, or the like can be considered.

The rotating end detecting portion 516 and 517 are limit switches to detect the rotational termination of the rotating portion 511.

Although not shown in the figure, a power supply circuit of the driving motor 512 is configured so that a current is blocked and the motor 512 stops when the rotating portion 511 is in contact with a sensing portion of rotating end detecting portion 516 or 517.

The filter frame 524 has an optical filter 500 mounted thereon, and is supported from the rotating portion 511 by two protrusion shaped retaining portions 522 and 523 while being perpendicular to the bottom face of the base portion 515. The first retaining portion 522 is composed of a first shaft for supporting to support a portion of a side disposed in the vicinity of the first side 503 moving upstream in the optical path, from among the two sides 503 and 504 of the optical filter 500 perpendicular to a plane formed by the illumination optical axis L. The second retaining portion 523 is composed of a second shaft to support a portion of the side closer to the second side 504 from the first retaining portion 522.

One retaining portion 522 of the filter frame 524 is guided to the first guide groove 518 of the base portion 515 and, at the same time, is engaged with the first engagement groove 520 of the rotating portion 511. Further, one retaining portion 523 of the filter frame 524 is guided to the second guide groove 519 of the base portion 515 and, at the same time, is engaged with the second engagement groove 521 of the rotating portion 511. The retaining portions 522 and 523 are engaged with the engagement grooves 520 and 521 of the rotating portion 511 via the guide grooves 518 and 519, respectively and, in this state, are retained in the rotating portion 511.

Furthermore, the first guide groove 518 is formed in a substantially straight-line form and guides the first retaining portion 522 so that the first retaining portion is movable along a direction that is substantially parallel to the illumination optical axis L. Further, a substantially straight-line includes a very smooth circular arc form as well as a complete straight line. The second guide groove 519 is formed in a circular arc form, and guides the second retaining portion 523 along a direction that is not parallel to the illumination optical axis L. These guide grooves 518 and 519 are designed so that the rotating portion 511 is rotated and one retaining portion 522 and the other retaining portion 523 of the optical filter 500 each moves accordingly, so that the optical filter 500 is rotated by approximately 90° about the rotational shaft parallel to the rotational shaft.

In this case, although described below, the optical filter 500 is movably designed not to interfere with each component in the light guide 47 and also to prevent the optical filter 500 from being protruded from the light guide 47 when moving from a position at which the light flux of the light source device passes through to a position at which the light flux does not pass through when this moving mechanism 510D is assembled into the light guide 47.

Further, at a position of the optical filter 500 shown in FIGS. 15 and 16, when assembled into the light guide 47, the light flux of the light source device is passing through the optical filter 500.

In moving the optical filter 500 from this state to a position at which a light flux does not pass through the optical filter 500, a predetermined manipulation signal of a projector, such as a switch manipulation to change the position of the optical filter 500, and an image quality mode selection signal of a projected image or the like, is first received, and a current is then supplied to the motor 512 by a control circuit, which is not shown in the figure, to initiate the rotation of the driving motor 512. Accordingly, the optical filter 500 moves out of the optical path according to the rotational movement of the rotating portion 511.

The rotational termination of the rotating portion 511 is sensed as the rotating portion 511 is in contact with the sensing portion of the rotating end detecting portion 517. If the rotational termination is sensed, the current to the driving motor 512 is blocked and thus the rotation of the driving motor 512 stops, resulting in the termination of rotational operation of the optical filter 500.

Further, when the reverse rotating manipulation of the optical filter 500 is desired to be carried out, the current supplied to the driving motor 512 need only be converted between positive and negative. In this case, the rotation of the above-described rotating portion 511 and optical filter 500 is done in a direction opposite to that described above. A predetermined manipulation signal is received. The rotation of the motor 512 is initiated, and the sensing portion of the rotating end detecting portion 516 and the rotating portion 511 contact to each other. The current to the driving motor 512 is blocked to halt the rotation of the driving motor 512, resulting in the termination of rotational operation of the optical filter 500.

Returning to FIG. 14, for the moving mechanism 510D, the moving mechanism 510D in a situation where the light flux of the light source device of the projector passes through the optical filter 500 is indicated by a solid line, and the moving mechanism 510D in a situation where the light flux does not pass through the optical filter 500 is indicated by a dotted line. In any case, members rotated by the moving mechanism 510D are not protruded from the light guide 47 by the rotation.

With this exemplary embodiment, the following effects are obtained in addition to the effects as in the first exemplary embodiment.

Because the optical filter 500 does not protrude from the light guide 47 by disposing a moving mechanism 510D moving into and out of the optical path of the light flux by the rotation of the optical filter 500 in the light guide 47, miniaturization of the light guide 47 becomes possible. Also there is no need to consider light leakage from the light guide 47, or the like.

The base portion 515 of the moving mechanism 510D is composed of a metal plate. Thus an excellent heat radiation effect is obtained and consequences by the variations or the like due to heat inside the light guide 47 can be dismissed.

Further, although, in this exemplary embodiment, the rotating portion 511 is configured to rotate by the actions of the rack portion 514 disposed at the rotating portion 511 and the pinion disposed on the rotational shaft of the driving motor 512, the present invention is not limited to the rack and the pinion only if the rotating portion 511 is allowed to rotate in any method. For example, the rotating portion 511 may be rotated by disposing a separate delivering mechanism between the motor 512 and the rotating portion 511, or the rotating portion may be manually rotated without using the motor 512.

Further, although in this exemplary embodiment, the moving mechanism realizing the rotational locus indicated by the arrow A in FIG. 5 among the rotational locus of the optical filter 500 of the first exemplary embodiment is described, the moving mechanism of this exemplary embodiment may be also applied to the moving mechanism realizing the rotational locus indicated by the arrow A in FIG. 9 among the rotational locus of the optical filter 500A of the second exemplary embodiment. Furthermore, in the third exemplary embodiment, the moving mechanism of this exemplary embodiment may be applied to a case where an undivided optical filter is employed instead of the optical filter 500B divided into two optical filter members 501 and 502, as shown in the first or second exemplary embodiment.

F. Other Exemplary Embodiments

Further, the present invention is not limited to the exemplary embodiments, and variations, modifications, or the like, are included in the present invention.

In the above-described exemplary embodiment, the optical filter is disposed vertically to the illumination optical axis, but the surface of the optical filter may be disposed to be inclined at a predetermined angle with respect to the illumination optical axis.

Furthermore, a selection property of the dichroic film making up the above-described optical filters 500, 500A, 500B and 500C can be properly modified by considering spectral component as being a correction target, a ratio thereof, or a position where the optical system is disposed.

For example, in the first exemplary embodiment, the optical filter 500 is disposed on the optical path of the light (light mixed with green and blue light components) excluding the red color light by the dichroic mirror 421, and the spectra of the green and blue light components are corrected by the optical filter 500. Instead, the spectra of the red and green light components may be corrected by separating the blue color light with the dichroic mirror 421 and thus by disposing the optical filter 500 on the optical path of the light (light mixed with red and green light components) excluding the blue color light. Alternatively, the spectra of the red and blue light components may be corrected by separating the green color light with the dichroic mirror 421 and thus by disposing the optical filter on an optical path of the light (light mixed with red and blue light components) excluding the green color light.

Further, although, in the second exemplary embodiment, the optical filter 500A is disposed between the dichroic mirror 422 and the incident side lens 431, the present invention is not limited to it and the position to be disposed may be properly changed only if the optical filter is disposed within the optical path of the blue color light. Moreover, as described above, because the relay optical system is not limited to the blue color light and may be used for the other color light components, spectra of the green or red light components may be corrected when the relay optical system is employed for the green color light or the red color light.

Further, although, in the fourth exemplary embodiment, the optical filter 500C is disposed between the cross dichroic prism 444 and the projection lens 46, the present invention is not limited to it and the optical filter may be disposed on the projection lens 46 (on an optical path from an incident end to an emitting end).

What is claimed is:

1. A projector, comprising:
   a light source;
   a color separating optical system to separate a light flux emitted from the light source into a plurality of color light components;
   a plurality of optical modulation devices to modulate the color light components separated by the color separating optical system according to image information, respectively;
   a color combining optical system to combine optical images modulated by the plurality of optical modulation devices; and
   a projection optical system to enlarge and project the optical images combined by the color combining optical system,
   an optical filter, to reflect predetermined spectral components in the light flux, being arranged at a position where an angle by which the light flux expands falls within 20° with respect to an illumination optical axis of the light flux on an optical path from the light source to a light flux-emitting surface of the projection optical system.

2. The projector according to claim 1, further comprising:
   a case to house a plurality of optical components disposed on the optical path of the light flux,
   the case including a moving mechanism to move the optical filter into and out of the optical path.

3. The projector according to claim 1,
   the optical filter being disposed between the light source and the color separating optical system.

4. The projector according to claim 3, further comprising:
   a uniform-illumination optical system disposed between the light source device and the color separating optical system to divide the light flux emitted from the light source device into a plurality of partial light fluxes and overlapping the respective partial light fluxes on an image forming area of the optical modulation device,
   the optical filter being disposed in the uniform-illumination optical system.

5. The projector according to claim 1,
   the optical filter being disposed in the color separating optical system.

6. The projector according to claim 5,
   the color separating optical system including a first color light separating optical element to separate the light emitted from the light source into a first color light component and other color light components, and a second color light separating optical element to separate the other color light components separated by the first color light separating optical element into a second color light component and a third color light component, and
   the optical filter being disposed between the first color light separating optical element and the second color light separating optical element.

7. The projector according to claim 1,
   the optical filter being disposed between the color combining optical system and the projection optical system.

8. A projector, comprising:
   a light source;
   a color separating optical system to separate a light flux emitted from the light source into a plurality of color light components;
   a plurality of optical modulation devices to modulate the color light components separated by the color separating optical system according to image information, respectively;
   a color combining optical system to combine optical images modulated by the plurality of optical modulation devices;
   a projection optical system to enlarge and project the optical images combined by the color combining optical system;
   a case to house a plurality of optical components, disposed on an optical path of the light flux;
   an optical filter to reflect predetermined spectral components in the light flux; and
   a moving mechanism to move the optical filter into and out of the optical path by rotating the optical filter inside the case.

9. The projector according to claim 8,
   the moving mechanism rotating the optical filter between a position at which the light flux passes through and a position at which the light flux does not pass through along a side wall on the optical path in the case.

10. The projector according to claim 8, further comprising:
    a uniform-illumination optical system disposed between the light source and the color separating optical system to divide the light flux emitted from the light source into a plurality of partial light fluxes and overlapping the respective partial light fluxes on an image forming area of the optical modulation device,
    the optical filter being disposed in the uniform-illumination optical system.

11. The projector according to claim 8,
    the optical filter being disposed in the color separating optical system.

12. The projector according to claim 11,
    the color separating optical system includes:
    a first color light separating optical element to separate the light emitted from the light source device into a first color light component and other color light components; and
    a second color light separating optical element to separate the other color light components separated by the first color light separating optical element into a second color light component and a third color light component, and
    the optical filter being disposed between the first color light separating optical element and the second color light separating optical element.

13. The projector according to claim 8,
    the case having a plane substantially parallel to a plane formed by an illumination optical, axis of the optical path, the moving mechanism including a rotating portion rotatably supported by the plane of the case, and the optical filter being retained in the rotating portion and moving according to rotational movement of the rotating portion.

14. The projector according to claim 13, the optical filter being mounted in a filter frame having a retaining portion protruded from the optical filter, the rotating portion having an engagement hole engaged with the retaining portion in the filter frame, and a guide groove being disposed between the optical filter and the rotating portion to guide the movement of the optical filter by guiding the retaining portion.

15. A projector, comprising:

a light source;

a color separating optical system to separate a light flux emitted from the light source into a plurality of color light components;

a plurality of optical modulation to modulate the plurality of color light components separated by the color separating optical system according to image information, respectively;

a color combining optical system to combine optical images modulated by the plurality of optical modulation devices;

a projection optical system to enlarge and project the optical images combined by the color combining optical system, an optical filter to reflect predetermined spectral components in the light flux; and a moving mechanism to move the optical filter into and out of the optical path, the moving mechanism sliding the optical filter out of the optical path by allowing a first side, which is closer to an optical component downstream in the optical path from the optical filter and remoter from an optical component upstream in the optical path from the optical filter, to move upstream in the optical path and by allowing a second opposite side to be positioned downstream in the optical path, from among the two sides of the optical filter perpendicular to a plane formed by an illumination optical axis.

16. The projector according to claim 15, the moving mechanism including:

a first shaft to support a portion of a side different from the first and second sides of the optical filter and disposed in the vicinity of the first side;

a second shaft to support a portion of the side different from the first and second sides of the optical filter and closer to the second side from the first side;

a first guide groove to guide the first shaft so that the first shaft is movable along a direction substantially parallel to the illumination optical axis; and a second guide groove to guide the second shaft so that the second shaft is movable along a direction which is not parallel to the illumination optical axis.

17. The projector according to claim 16, the moving mechanism including a rotating portion rotatably supported on a plane parallel to the plane formed by the illumination optical axis, and the first shaft and the second shaft being retained in the rotating portion through the first guide groove and the second guide groove, respectively.

18. A projector, comprising:

a light source device;

a color separating optical system to separate a light flux emitted from the light source device into a plurality of color light components;

a plurality of optical modulation devices to modulate the plurality of color light components separated by the color separating optical system according to image information, respectively, a color combining optical system to combine optical images modulated by the plurality of optical modulation devices;

a projection optical system to enlarge and project the optical images combined by the color combining optical system, an optical filter to reflect predetermined spectral components in the light flux;

a moving mechanism to move the optical filter into and out of the optical path, and the moving mechanism moving the optical filter out of the optical path, by allowing an opposite side to be rotated using, as a shaft, the vicinity of a side which is closer to an optical component downstream in the optical path from the optical filter and remoter from an optical component upstream in the optical path from the optical filter, from among the two sides of the optical filter perpendicular to a plane formed by an illumination optical axis.

19. The projector according to claim 15, the optical filter being disposed between the light source device and the color separating optical system.

20. The projector according to claim 19, further comprising:

a uniform-illumination optical system disposed between the light source device and the color separating optical system to divide the light flux emitted from the light source device into a plurality of partial light fluxes and overlapping the respective partial light fluxes on an image forming area of the optical modulation device, the moving mechanism being disposed in the uniform-illumination optical system.

21. The projector according to claim 15, the optical filter being disposed in the color separating optical system.

22. The projector according to claim 21, the color separating optical system including a first color light separating optical element to separate the light emitted from the light source device into a first color light component and other color light components, and a second color light separating optical element to separate the other color light components separated by the first color light separating optical element into a second color light component and a third color light component, and wherein the optical filter being disposed between the first color light separating optical element and the second color light separating optical element.

23. The projector according to claim 15, the optical filter being disposed between the color combining optical system and the projection optical system.

* * * * *